(12) United States Patent
Ishizaka

(10) Patent No.: US 7,155,069 B2
(45) Date of Patent: Dec. 26, 2006

(54) IMAGE PROCESSING APPARATUS, IMAGE PROCESSING METHOD, AND IMAGE PROCESSING PROGRAM

(75) Inventor: Kanya Ishizaka, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 744 days.

(21) Appl. No.: 10/359,643

(22) Filed: Feb. 7, 2003

(65) Prior Publication Data
US 2003/0179953 A1 Sep. 25, 2003

(30) Foreign Application Priority Data
Mar. 20, 2002 (JP) ............................ P2002-079388

(51) Int. Cl.
G06K 9/32 (2006.01)
(52) U.S. Cl. ...................... 382/298; 382/256; 382/293; 358/1.2; 358/451
(58) Field of Classification Search ................ 382/190, 382/282, 298, 256, 259; 358/1.2, 528, 538, 358/537, 451
See application file for complete search history.

(56) References Cited

U.S. PATENT DOCUMENTS

| | | | | |
|---|---|---|---|---|
| 5,029,017 A | * | 7/1991 | Abe et al. | 358/451 |
| 5,335,296 A | * | 8/1994 | Larkin et al. | 382/298 |
| 5,453,788 A | * | 9/1995 | Matsushima et al. | 348/395.1 |
| 5,535,007 A | * | 7/1996 | Kim | 358/296 |
| 5,566,252 A | * | 10/1996 | Miyaza | 382/298 |
| 5,901,274 A | * | 5/1999 | Oh | 358/1.2 |
| 5,982,942 A | * | 11/1999 | Hosokawa | 382/266 |
| 6,002,811 A | * | 12/1999 | Koshimizu et al. | 382/298 |
| 6,141,017 A | | 10/2000 | Cubillo et al. | |
| 6,297,829 B1 | * | 10/2001 | Sekine et al. | 345/467 |
| 6,466,954 B1 | * | 10/2002 | Kurosawa et al. | 715/520 |
| 6,546,152 B1 | * | 4/2003 | Hou | 382/284 |
| 6,590,584 B1 | * | 7/2003 | Yamaura et al. | 715/704 |
| 6,928,397 B1 | * | 8/2005 | Matsushiro | 703/2 |

FOREIGN PATENT DOCUMENTS

| | | |
|---|---|---|
| JP | 2968582 B2 | 8/1999 |
| JP | 11-331595 | 11/1999 |

OTHER PUBLICATIONS

U.S. Appl. No. 10/288,427, filed Nov. 6, 2002.
Mitra, Suman K., et al., A technique for image magnification using partitioned iterative function system, Apr. 29, 1999, pp. 1119-1133.

* cited by examiner

*Primary Examiner*—Jingge Wu
*Assistant Examiner*—Yosef Kassa
(74) *Attorney, Agent, or Firm*—Morgan, Lewis & Bockius LLP

(57) ABSTRACT

A first image enlargement processing section enlarges an original image to a specified size to generate an initial enlarged image. A domain block extraction section extracts a domain block image from the original image. A range block extraction section extracts a range block image from the neighborhood of the correspondence part of the domain block image in the initial enlarged image. A reduced range block preparation section reduces the range block image to the domain size to generate a reduced range block image. An enlarged range block preparation section enlarges the most similar range block image having the highest degree of similarity to an enlargement size to generate an enlarged pseudo domain block image. An enlarged image acquisition section 676 uses each enlarged pseudo domain block image to generate an enlarged image of the original image.

24 Claims, 17 Drawing Sheets

$Q11 = (4*P11 + 4*P21 + 2*P31 + 4*P12 + 4*P22 + 2*P32 + 2*P13 + 2*P23 + 1*P33)/25$ $Q21 = (2*P31 + 4*P41 + 4*P51 + 2*P32 + 4*P42 + 4*P52 + 1*P33 + 2*P43 + 2*P53)/25$ $Q12 = (2*P13 + 2*P23 + 1*P33 + 4*P14 + 4*P24 + 2*P34 + 4*P15 + 4*P25 + 2*P35)/25$ $Q22 = (1*P33 + 2*P43 + 2*P53 + 2*P34 + 4*P44 + 4*P54 + 2*P35 + 4*P45 + 4*P55)/25$

CORRESPONDENCE WHEN 5 x 5 IS REDUCED TO 2 x 2

AREA RATIO WHEN 5 x 5 IS PROJECTED TO 2 x 2 (PART)

$Q11 = (16*P11 + 4*P21 + 4*P12 + 1*P22)/25$
$Q21 = (12*P21 + 8*P31 + 3*P22 + 2*P32)/25$
$Q31 = (8*P31 + 12*P41 + 2*P32 + 3*P42)/25$
$Q41 = (4*P41 + 16*P51 + 1*P42 + 4*P52)/25$
$Q12 = (12*P12 + 3*P22 + 8*P13 + 2*P23)/25$
$Q22 = (9*P22 + 6*P32 + 6*P23 + 4*P33)/25$
$Q32 = (6*P32 + 9*P42 + 4*P33 + 6*P43)/25$
$Q42 = (3*P42 + 12*P52 + 2*P43 + 8*P53)/25$
$Q13 = (8*P13 + 2*P23 + 12*P14 + 3*P24)/25$
$Q23 = (6*P23 + 4*P33 + 9*P24 + 6*P34)/25$
$Q33 = (4*P33 + 6*P43 + 6*P34 + 9*P44)/25$
$Q43 = (2*P43 + 8*P53 + 3*P44 + 12*P55)/25$
$Q14 = (4*P14 + 1*P24 + 16*P15 + 4*P25)/25$
$Q24 = (3*P24 + 2*P34 + 12*P25 + 8*P35)/25$
$Q34 = (2*P34 + 3*P44 + 8*P35 + 12*P45)/25$
$Q44 = (1*P44 + 4*P54 + 4*P45 + 16*P55)/25$

CORRESPONDENCE WHEN 5 x 5 IS REDUCED TO 4 x 4

PROJECTION REDUCTION

AREA RATIO WHEN 5 x 5 IS PROJECTED TO 4 x 4 (PART)

FIG. 15

VERTICAL EDGE
DETECTION FILTER

| -1 | 0 | 1 |
|---|---|---|
| -1 | 0 | 1 |
| -1 | 0 | 1 |

HORIZONTAL EDGE
DETECTION FILTER

| -1 | -1 | -1 |
|---|---|---|
| 0 | 0 | 0 |
| 1 | 1 | 1 |

FIG. 16

| SPECIFIED ENLARGEMENT RATIO | ENLARGEMENT RATIO COMBINATION | MAGNIFICATION COMBINATION TO PROVIDE BEST IMAGE QUALITY | EXAMPLE OF COMBINATION IN WHICH MEMORY AND SPEED ARE EFFICIENT |
|---|---|---|---|
| 2 | 2 | (2) | (2) |
| 3 | 3 | 2*2→3/4 | 2→3/4→2 |
| 4 | 2*2 | (2*2) | (2*2) |
| 5 | 5 | 2*2*2→5/8 | 2*2→5/8→2 |
| 6 | 2*3 | 2*2*2→6/8 | 2*2→6/8→2 |
| 7 | 7 | 2*2*2→7/8 | 2*2→7/8→2 |
| 8 | 2*4 | 2*2*2 | 2*2*2 |
| 9 | 3*3 | 2*2*2*2→9/16 | 2*2→9/16→2*2 |
| 10 | 2*5 | 2*2*2*2→10/16 | 2*2→10/16→2*2 |
| 11 | 11 | 2*2*2*2→11/16 | 2*2→11/16→2*2 |
| 12 | 3*4 | 2*2*2*2→12/16 | 2*2→12/16→2*2 |
| 13 | 13 | 2*2*2*2→13/16 | 2*2→13/16→2*2 |
| 14 | 2*7 | 2*2*2*2→14/16 | 2*2→14/16→2*2 |
| 15 | 3*5 | 2*2*2*2→15/16 | 2*2→15/16→2*2 |
| 16 | 4*4 | 2*2*2*2 | 2*2*2*2 |

IMAGE PROCESSING APPARATUS, IMAGE PROCESSING METHOD, AND IMAGE PROCESSING PROGRAM

The present disclosure relates to the subject matter contained in Japanese Patent Application No. 2002-079388 filed on Mar. 20, 2002, which is incorporated herein by reference in its entirety.

BACKGROUND OF THE INVENTION

1. Field of the Invention

This invention is intended for enlargement processing of an image represented with a multi-step graduation and relates in particular to an image processing apparatus, an image processing method, and an image processing program for performing the enlargement processing using a computer.

2. Description of the Related Art

Image enlargement processing is one type of basic signal processing for a digital image. For example, various high-quality image processing functions are demanded in fields such as database and high-definition color print, and image enlargement is demanded as one of the image processing functions. The image enlargement processing is one type of basic processing for a system such as editing, filing, displaying, and printing images. For example, to print out a digital image input externally on a printer different in resolution or display the digital image on an enlarged scale on a display, image enlargement processing is required.

In recent years, displaying or printing of such digital images with high quality has been demanded with distribution of digital cameras, scanners, electronic documents, and HTML (Hyper Text Markup Language) documents. The digital images have various resolutions and to output the digital image on a printer or display the digital image on a display, resolution conversion is required. Most of the digital images obtained via a network are low-resolution images; particularly in such a case, the high-quality enlargement art of the image becomes necessary.

For example, to output an image onto a 600-dpi printer, it becomes necessary to enlarge the image eight times. In recent years, distribution of inexpensive low-resolution digital cameras has been started; and to print a low-resolution image of 640×480 pixels photographed by such a digital camera, the image enlargement technology becomes one of the most important image processing. In addition, in output of a large-format print (poster image) and enlargement output of a part of a digital image, high-quality enlargement at a large enlargement ratio is demanded.

The enlargement processing is an extremely important function that can also be used as a resolution conversion technique required for connecting media different in resolution, such as an HDTV (high-definition television), an NTSC television, an electronic still camera, a medical image system, and a print image system. Further, in recent years, with the widespread of image data, mainly intended for display at a comparatively low resolution in the neighborhood of 75 dpi (display resolution) of an image on an Internet home page, digital video, the need for high-quality enlargement processing has also grown to produce the high-quality output result in printing the low-resolution images on a high-resolution printer.

Hitherto, a large number of techniques have been proposed as a technique of performing enlargement processing of a multilevel image represented with a multi-step gradation, namely, finding the values of pixel positions after enlargement. For example, enlargement techniques based on interpolation of nearest neighbor method, linear interpolation or bilinear method, cubic convolution method, which will be hereinafter also referred to as interpolation enlargement techniques, are well known.

The nearest neighbor method is a method of using as each pixel value after enlargement, the pixel value of the nearest pixel when each pixel is inversely mapped onto the original image. For example, letting the enlargement ratio in the x direction be a and that in the y direction be b, an inverse map point on the original image resulting from multiplying each coordinate point (X, Y) after enlargement by 1/a and 1/b is calculated and the pixel value on the original image nearest to the inverse map point is used as the pixel value of (X, Y).

The linear interpolation or bilinear method is a method of assuming that the pixel value between pixels changes linearly, referencing nearby pixels of the inverse map point of pixel after enlargement (for example, four nearby pixels), and performing linear approximation (linear interpolation) of the area surrounded by the pixel points (four points (four nearby pixels)) in the x direction and the y direction to find the pixel value at the inverse map point. The linear interpolation or bilinear method involves heavier processing load than the nearest neighbor method, but involves comparatively small computation amount and the linear interpolation itself produces the smoothing effect, so that jaggies are hard to be noticeable as compared with the nearest neighbor method.

The cubic convolution method is a method of defining an interpolation function approximating a sinc function {sinc(x)=sin(x)/x} based on a sampling theorem and performing convolution of nearby pixels of the inverse map point of pixel after enlargement (for example, 16 pixels (four by four pixels in the X direction and Y direction)) and the approximate interpolation function to find the pixel value after enlargement. This is based on the idea of suppressing aliasing distortion caused by resampling using the fact that the frequency characteristic of the sinc function is ideal, namely, it becomes "1" within Nyquist frequency and becomes "0" outside the Nyquist frequency. The method can provide a sharp image, so that the image quality is comparatively good as compared with the two methods described above.

However, the interpolation enlargement techniques tend to substantially cause the image to blur. Since the nearest neighbor method is easy processing and involves small computation amount, processing can be performed at high speed, but one pixel of the original image is enlarged intact to a rectangular shape. Thus, if the original image contains an oblique line or a boundary line, degradation of jaggies occurs in an edge or the oblique line portion in the enlarged image or if the magnification is large, the image becomes tessellar (blocky); the degree of visual image quality degradation is large.

The linear interpolation or bilinear method produces strong smoothing (low-pass filter (LPF)) effect. Thus, for example, LPF function is received centering on the edge portions not applied to the assumption of linear change, resulting in a smoothed image; the image becomes blurred as a whole. The cubic convolution method involves a large reference range and the computation amount is increased as compared with the two methods described above. Thus, the cubic convolution method is not appropriate when high-speed processing is required.

The sinc function, which is an infinitely continuous function, has a characteristic of high-frequency enhancement caused by use of the approximate function provided by discarding the sinc function in a predetermined range (−2 to 2 in the example of 16 pixels); light jaggies occur in edge portions and the noise component is enhanced although they are less than those of the nearest neighbor.

In contrast, recently, an enlargement technique of pixel value estimation type of estimating the pixel values of an enlarged image from information of the original image and preventing blurring, jaggies, or block distortion to occur has been proposed as an approach entirely different from the interpolation enlargement techniques described above. Some of the enlargement techniques of pixel value estimation type use IFS (Iterated Function System) of the concept of fractal (as described in Japanese Patent No. 2,968,582). Hereinafter, the enlargement technique of pixel value estimation type using the concept of fractal will be referred to as fractal enlargement technique.

The concept of fractal in digital image technologies is based on self-similarity assumption of an image on the premise that if a part of an image is taken out, another image resembling the taken-out image exists in the image in a different size and if necessary, in different orientation and different density. The fractal enlargement technique is a technique proposed coming with a fractal compression technique. Using the self-similarity of an image, about a minute rectangular area (called domain block) in an image, contraction, coordinate conversion of rotation or inversion in 90-degree units, and linear conversion of pixel values are performed from within the image. A search is made for the block most similar to the domain block (called range block), the image is divided according to the domain block, and the image is represented only by a set of the corresponding range block positions and coefficients of coordinate conversion and pixel value conversion used in the correspondence.

When the objective image is again formed from the set of the range block positions, coordinate conversion, and pixel value conversion, the operation of assigning the result of performing coordinate conversion and pixel value conversion to range block for any initial image to domain block is iterated. If the given number of iterations is reached or change caused by iteration becomes a threshold value or less, the processing is terminated and the image is reconstituted. The fact that as sufficient approximation of domain and range blocks is executed at the coding time, an image sufficiently close to the original image can be reconstituted is guaranteed by so-called collage theorem in the fractal theory. Such a fractal theory is described in detail in "Fractals Everywhere" (Michel F. Barnsley, Academic Press (1988)).

The fractal enlargement technique uses the self-similarity between block images different in size in an image and thus has the advantage that it does not depend on the resolution at the decoding time; it is an enlargement technique capable of also providing high-quality image output at a comparatively large enlargement ratio. For example, Japanese Patent No. 2,968,582 proposes a method of providing an enlarged image by repeating processing of finding the result of performing coordinate conversion and pixel value conversion for range block image enlarged at the same ratio as initial image is enlarged for any initial image of an enlargement size and replacing with enlarged domain block image position. In this method, the feature of fractal is utilized, jaggy occurrence is suppressed, and an enlarged image less blurred can be provided.

However, enlargement according to the fractal enlargement technique involves image quality problems of block distortion caused by discontinuity on domain block boundaries and noise and blurring caused by pattern crushing of a texture portion (busy portion) and further occurrence of noise-like garbage and fine-split-like pixel value staining although it is sharp for a binarily changing portion of a step edge part or of a document image.

For example, U.S. Pat. No. 6,141,017, JP-A-11-331595, and the like propose techniques as attempt to solve the image quality problems involved in the fractal enlargement technique.

U.S. Pat. No. 6,141,017 proposes a technique of preparing duplication of a domain block image and when assigning a range block, assigning only the inner portion of the range block to the corresponding inner portion of the domain block, thereby suppressing discontinuity occurring on the block image boundaries and a technique of separating block into an edge part and a flat part from scattering of pixel values in the block required when a pixel value conversion coefficient is found and performing enlargement processing with good edges by fractal enlargement while suppressing the picture-tinted flat part by using a different technique for the flat part. However, the technique still cannot solve degradation caused by noise-like garbage and fine-split-like pixel value staining in a step edge part or degradation of noise and blurring caused by pattern crushing of a texture portion (busy portion).

JP-A-11-331595 proposes a technique of performing both fractal enlargement and enlargement of linear interpolation or bilinear for an image and if the difference therebetween is small, adopting the result of the fractal enlargement and if the difference therebetween is large, adopting the result of the linear interpolation or bilinear or blending the results in response to the magnitude of the difference, thereby suppressing discontinuity on the block image boundaries. However, the technique tends to select the linear interpolation or bilinear in each edge portion where the difference between the fractal enlargement and the enlargement of linear interpolation or bilinear becomes large, and thus has disadvantage in that clear edge reproduction of the feature of fractal cannot be accomplished and blurring occurs.

Thus, the methods in the related arts for improving the fractal enlargement techniques separately present improvement on the image quality problems of blurring, jaggies, block distortion, etc., occurring when an enlarged image is provided, but the problems still are not totally solved. Particularly, it is difficult to provide an enlarged image with any other image quality performance enhanced while ensuring edge reproducibility.

SUMMARY OF THE INVENTION

It is therefore an object of the invention to provide an image processing apparatus and a program for making it possible to enlarge edge parts more sharply than related arts while enjoying the advantages of fractal techniques in related art examples that occurrence of image quality degradation caused by noise, jaggies, block distortion and the like is prevented.

According to the invention, there is provided an image processing apparatus for performing enlargement processing of an original image represented by a large number of pixels to provide an enlarged image, the image processing apparatus comprising a first image enlargement processing section for enlarging the original image at a preset enlargement ratio; a domain block extraction section for dividing the original image in first block units, thereby extracting a plurality of domain block images; and a range block extraction section for extracting a range block image in a second block unit larger than the first block unit about an initial enlarged image provided by the first image enlargement processing section.

The image processing apparatus also comprises an enlarged pseudo domain block preparation section for placing the range block image extracted by the range block extraction section in an enlarged block unit provided by enlarging the first block unit at a preset enlargement ratio and converting each of pixel values of the image placed in the enlarged block unit based on the relationship between the domain block image and the range block image, thereby preparing an enlarged pseudo domain block image; and an enlarged image acquisition section for acquiring an enlarged image provided by enlarging the original image at the setup enlargement ratio using each enlarged pseudo domain block image prepared by the enlarged pseudo domain block preparation section.

The invention as claimed in dependent claims defines more advantageous specific examples of the image processing apparatus according to the invention. Further, according to the invention, there is provided a program fitted for implementing the image processing apparatus according to the invention as software using an electronic computer. The program may be provided using a computer-readable storage medium storing the program or may be distributed through wired or wireless communication means.

In the described image processing apparatus, the first image enlargement processing section generates an initial enlarged image at the setup enlargement factor. The range block extraction section extracts a range block image in the second block unit larger than the first block unit from the initial enlarged image provided by enlarging the original image according to a predetermined method in the range block unit.

The enlarged pseudo domain block preparation section projects the extracted range block image in the enlarged domain block unit and prepares an enlarged pseudo domain block image based on the relationship between the domain block image and the reduced range block image (for example, similarity relationship). That is, the setup range block is projected to any desired size (at this time, predetermined pixel value conversion becomes necessary), and new pixel values are found based on the relationship between the domain block image (original image) and the range block image (pixel values are again converted).

The most of the features of the concept of fractal in the related arts is made in the point of setting domain blocks and range blocks and providing an enlarged image, and an enlarged image can be provided.

In the configuration in which the edge enhancement processing section is provided, the edge enhancement processing section performs appropriate edge enhancement of found new block pixel values from the relationship between the maximum value and the minimum value in the block.

In the configuration in which the iterated processing control section is provided, the iterated processing control section repeats enlargement processing using the once enlarged image again as a range block reference image, thereby providing a sharp high-quality image with less noise.

BRIEF DESCRIPTION OF THE DRAWINGS

FIG. 15 is a drawing to show examples of edge detection filters used in enlargement processing of a fourth embodiment of the invention;

FIG. 16 lists processing in the fifth embodiment with respect to general integer m-time enlargement and is a drawing to show examples of enlargement ratio combinations.

DETAILED DESCRIPTION OF THE PREFERRED EMBODIMENTS

Referring now to the accompanying drawings, there are shown preferred embodiments of the invention.

Figure 1:
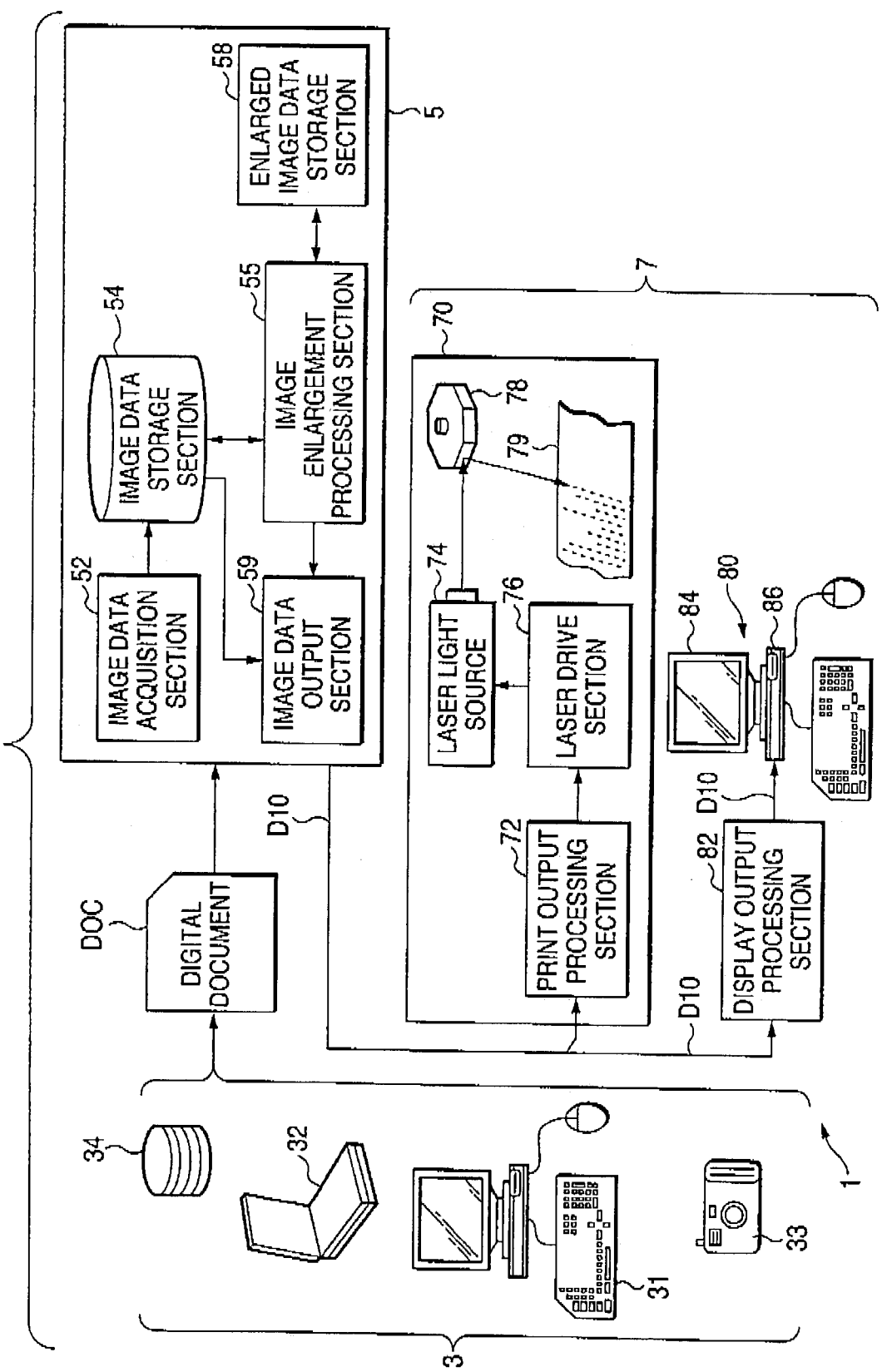
FIG. 1 is a block diagram to show an image processing system comprising an image processing apparatus according to the invention.

FIG. 1 is a block diagram to show an image processing system (hereinafter refer to simply as a "system") 1 comprising an image processing apparatus according to the invention. The system 1 comprises image input terminals 3, an image processing apparatus 5, and image output terminals 7.

The image input terminals 3 can include any number of image sources, such as a personal computer 31, a color scanner 32, a digital camera 33, and a storage medium 34 of a hard disk, for preparing or editing a digital document (hereinafter refer to simply as "document") DOC. For example, each image input terminal may be a terminal comprising a communication function for acquiring an image via a communication network (not shown). An application program for preparing a document DOC and the like are built in each terminal. Image data representing the document DOC is described in an image format (for example, JPEG, BMP, PNG, etc.,) that can be handled in the image processing apparatus 5. The image input terminal 3 inputs the document DOC to the image processing apparatus 5 forming a part of the system 1.

The image processing apparatus 5 comprises an image data acquisition section 52 for acquiring digital image data representing a document DOC, an image data storage section 54 for temporarily storing image data, an image enlargement processing section 55 for performing enlargement processing of an image to any desired setup resolution, an enlarged image data storage section 58 for storing an enlarged image data, and an image data output section 59 for inputting enlarged image data D10 representing an enlarged image to any of the image output terminals 7. The image processing apparatus 5 may comprise a decompression processing section for decompressing an image if the image acquired by the image data acquisition section 52 is a compressed image.

The image data storage section 54 retains the input image acquired by the image data acquisition section 52, the enlarged image data provided by the image enlargement processing section 55, various intermediate computation results and processing parameters used in enlargement processing of the image enlargement processing section 55, and the like.

The image output terminals 7 can operate together with various functions of the image processing apparatus 5 and comprises a print engine 70 on a raster output scan (ROS) basis for operating the system 1 as a digital print system, a display 80 for operating the system 1 as an image display system, and the like.

The print engine 70 has a print output processing section 72 for performing predetermined printout processing for the enlarged image data D10 output from the image processing apparatus b, a laser light source 74 for emitting a light beam, a laser drive section 76 for controlling, namely, modulating the laser light source 74 in accordance with data output from the print output processing section 72, and a polygon mirror (rotating polygon mirror) 78 for reflecting the light beam emitted from the laser light source 74 toward a photosensitive member 79.

The print output processing section 72 generates data representing a plurality of separation colors, preferably at least three separation colors in accordance with a known art for the enlarged image data D10 representing an enlarged image and renders the data (expands the data to raster data). For example, from a YCrCb color system represented by decompression color correction digital data D10, at least three (preferably, four) data pieces are mapped into a CMY color system or a CMYK color system, for example, and raster data subjected to color separation for printout is generated.

In such conversion processing to raster data, the print output processing section 72 performs undercolor removal (UCR) of performing a subtractive process of CMY components of a color image or gray component replacement (GCR) of replacing the CMY components subjected to a subtractive process partially with K component. Further, the print output processing section 72 may linearize color separation or perform similar processing to adjust a toner image of an output image prepared in response to output data (for instance, in CMYK).

According to the configuration, the print engine 70 reflects the light beam emitted by the laser light source 74 on a plurality of races on the polygon mirror 78 for exposing the photosensitive member 79 to the light and performs scanning to form a latent image on the photosensitive member 79. When a latent image is foamed, the image is developed according to any of a large number of known methods in the technical field, and the color image enlarged by the image processing apparatus 5 is output as a visible image.

A color image not subjected to enlargement processing can also be output as a visible image. When a color image is output as a visible image, the data representing the image includes at least three (preferably, four) color separation data pieces (for example, C, M, Y, K), and each color is processed as a separate image face or in a brightness-chrominance format.

The display 80 comprises a display output processing section 82 for performing predetermined output processing in accordance with the enlarged image data D10 output from the image processing apparatus 5 and a display section 84 of a CRT, liquid crystal display (LCD), organic EL, or the like for displaying a visible image based on the data output from the display output processing section 82. The display output processing section 82 may be built in a personal computer main unit 86 used together with the display section 84, for example, as software or hardware. The display output processing section 82 generates data representing a plurality of separation colors, preferably at least three separation colors in accordance with a known art for the enlarged image data D10 input from the image processing apparatus 5 and renders the data (expands the data to raster data).

For example, mapping from the YCrCb color system represented by the enlarged image data D10 into an RGB color system, for example, is performed and raster data subjected to color separation for display is generated. In such conversion processing to raster data, the display output processing section 82 may perform color correction processing responsive to the taste of the operator. According to the configuration, the display 80 outputs the color image enlarged by the image processing apparatus 5 as a visible image. A color image not subjected to enlargement processing can also be output as a visible image.

A personal computer (PC) can also be used as the print output processing section 72 or the display output processing section 82. The personal computer 31 as the image input terminal 3 may be used as the display 80.

Figure 2:
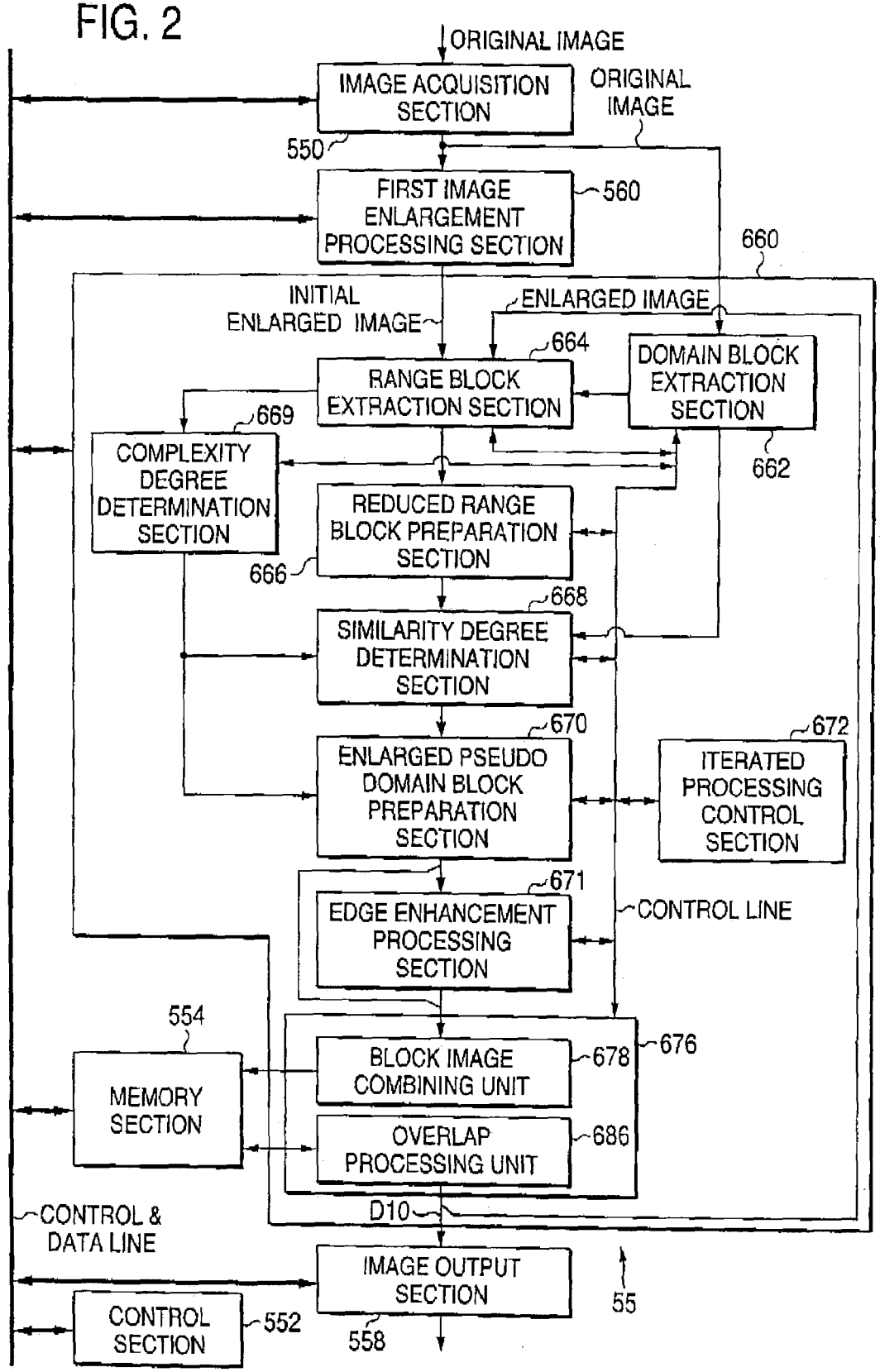
FIG. 2 is a block diagram to show details of a first embodiment of an image enlargement processing section in the image processing apparatus.

FIG. 2 is a block diagram to show details of a first embodiment of the image enlargement processing section 55 of the image processing apparatus 5. The image enlargement processing section 55 comprises an image acquisition section 550 for acquiring an image, a control section 552 for controlling the whole of the image enlargement processing section 55, a memory section 554 for temporarily storing data generated in processing of each functional part in the image enlargement processing section 55, and an image output section 558 for outputting an enlarged image generated in the image enlargement processing section 55 to the outside. The image enlargement processing section 55 also comprises a first image enlargement processing section 560 for performing first-stage enlargement processing and a second image enlargement processing section 660 for performing second-stage enlargement processing using the enlarged image generated in the first image enlargement processing section 560, the first and second image enlargement processing sections being functional parts involved in image enlargement processing.

The image acquisition section 550 inputs digitalized image data from the outside of the image enlargement processing section 55 and transfers the image data to the memory section 554. The memory section 554 retains the image data input from the image acquisition section 550, image data after enlargement required for performing enlargement processing, and various intermediate computation results, processing parameters and the like used in enlargement processing. The first image enlargement processing section 560 first enlarges the image to be processed, retained in the memory section 554.

The second image enlargement processing section 660 performs equal-magnification or reduction processing based on a predetermined processing algorithm for the enlarged image provided by the first image enlargement processing section 560, thereby generating an image enlarged relative to the original image. The processing contents of the first image enlargement processing section 560 and the second image enlargement processing section 660 will be described later in detail. The image output section 558 outputs the image data enlarged by the second image enlargement processing section 660 and the like to the outside of the image enlargement processing section 55.

The control section 552, the first image enlargement processing section 560, the second image enlargement processing section 660, or the like in the image enlargement processing section 55 shown in FIG. 2 may exist as a processing program module on computer or some or all of the sections may be implemented as dedicated hardware.

The second image enlargement processing section 660 has a large number of parts common to functional parts of image enlargement processing proposed in Japanese Patent Application No. 2001-341432 by the applicant of the invention, and the processing contents are also basically the same. However, they differ in range block setting object or size. The second image enlargement processing section 660 comprises added functional parts responsive thereto, as specifically described below.

The second image enlargement processing section 660 comprises a domain block extraction section 662 for extracting a domain block image of size D (main scanning direction X subscanning direction=MD×ND pixels; MD=ND also possible) of first block unit from an original image, and a range block extraction section 664 for extracting a plurality of range block images each of size R0 (main scanning direction X subscanning direction=MR0×NR0 pixels; MR0=NR0 also possible) of second block unit to the neighborhood of the domain block image of the original image. The second image enlargement processing section 660 also comprises a reduced range block preparation section 666 for reducing each of the range block images extracted by the range block extraction section 664 to the same size is that of the domain block image to generate a plurality of reduced range block images.

In the present specification, the term "block unit" is used to indicate a plurality of blocks characterized by the block size.

The second image enlargement processing section 660 also comprises a similarity degree determination section 668 for using each of the reduced range block images generated by the reduced range block preparation section 666 to determine the degree of similarity between each range block image and the domain block image extracted by the domain block extraction section 662. The second image enlargement processing section 660 also comprises an enlarged pseudo domain block preparation section 670 for performing enlargement processing of the range block image determined to have a higher degree of similarity with the domain block image (in the examples "highest degree of similarity") by the similarity degree determination section 668 among the range block images and generating an enlarged pseudo domain block image of the same size as that of an enlarged domain block image at an enlargement ratio r specified for the domain block image (size r*D) The second image enlargement processing section 660 also comprises an enlarged image acquisition section 676 for using each enlarged pseudo domain block image generated by the enlarged pseudo domain block preparation section 670 to acquire an enlarged image provided by enlarging the original image at a setup enlargement ratio.

The second image enlargement processing section 660 further comprises a complexity degree determination section 669 for determining the degree of complexity of each range block image. For example, the complexity degree determination section 669 determines whether or not the range block image contains a large number of peaks and valleys, in other words, contains much high-frequency component. The similarity degree determination section 668 references the degree of complexity of the range block image determined by the complexity degree determination section 669 and determines the degree of similarity. The enlarged pseudo domain block preparation section 670 references the degree of complexity of the range block image determined by the complexity degree determination section 669 and determines the pixel values of the enlarged pseudo domain block image.

The enlarged image acquisition section 676 has a block image combining unit 678 for acquiring the enlarged pseudo domain block images provided by the enlarged pseudo domain block preparation section 670 and combines the acquired enlarged pseudo domain block images to generate an enlarged image at an enlargement ratio set for the original image, and an overlap processing unit 686 for finding the pixel values of the pixels of the overlap duplicately processed accompanying overlap processing based on the pixel values of the pixels of the overlap.

The block image combining unit 678 stores the acquired enlarged pseudo domain block images in a predetermined area of the image data storage section 54, for example, thereby generating the enlarged image. The overlap processing unit 686 finds an average value or a median value of the pixel values of the overlap, for example, and adopts the found value as the value of the pixel.

The domain block extraction section 662 divides the original image into domain block images each of the MD×ND size and selects any one of the domain block images as a notable block image. The range block extraction section 664 selects all range block images each of the MR0×NR0 size from among block images of surrounding G×G size containing the domain block image extracted by the domain block extraction section 662 for each notable block image from the original image.

The reduced range block preparation section 666 uses a known technique of linear interpolation or bilinear, projection, etc., for example, to reduce all range block images each of the MR0×NR0 size provided by the range block extraction section 664 to reduced range block images each of MD×ND size, the same size as that of the range block image. The similarity degree determination section 668 selects the reduced range block image most similar to the domain block image extracted by the domain block extraction section 662, for example, the reduced range block image having the most similar pixel values and pattern as a whole from among the reduced range block images provided by the reduced range block preparation section 666, and adopts the reduced range block image as the most similar range block image (optimum range block image).

The enlarged pseudo domain block preparation section 670 uses a known technique of linear interpolation or bilinear, projection, etc., for example, to project the most similar range block image selected by the similarity degree determination section 668 to the size rD (enlarged block unit) and further again converts the pixel values based on the relationship between the domain block image and the range block image (in the example, similarity relationship), thereby preparing an enlarged pseudo domain block image and assigns the image as an enlarged block image to the domain block image.

That is, the second image enlargement processing section 660 uses the relationship between each domain block image and the range block image existing to the neighborhood of the domain block image to find the enlarged pseudo domain block image provided by enlarging the range block image, and replaces the enlarged domain block image with enlarged pseudo domain block image, thereby performing block image enlargement processing.

The second image enlargement processing section 660 also comprises an edge enhancement processing section 671 for performing edge enhancement processing for the enlarged pseudo domain block image provided by the enlarged pseudo domain block preparation section 670 in a predetermined condition, and an iterated processing control section 672 for iterating processing of the domain block extraction section 662 to the enlarged image acquisition section 676, which will be hereinafter also referred to as local collage processing, as many times as a predetermined number of times.

To begin with, a description will be given with an example wherein the domain block extraction section 662 extracts a domain block image of MD×ND=2×2 (domain size D=2) every processing and shifts the domain block image one pixel in the main scanning direction or the subscanning direction each time overlap processing is performed and the range block extraction section 664 generates a range block image of MR0×NR0=5×5 (range size R0=5) larger than the enlarged domain block image at enlargement ratio r=2 (MD2×ND2=4×4) for the extracted domain block image. That is, a description will be given with an example wherein processing in which the domain block extraction section 662 enlarges the domain block image of 2×2 size (domain size D=2) to the block image of 5×5 size and the image is assigned to the correspondence positions of a twice enlarged image is executed four times corresponding to all overlaps.

Embodiments described later are fitted as enlargement techniques particularly for a gray image; similar processing may be performed for a color image. In this case, it is advisable to adopt a technique of preparing a color image equivalent to a gray image with a 256-step gradation, for example, for data of each color (for example, R, G, B) representing that color image, enlarging each color image, and finally combining the images.

Figure 3:
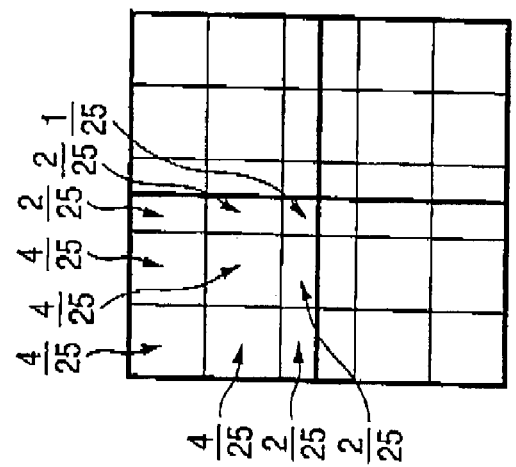
FIG. 3 is a drawing to describe processing when projection is used in a reduced range block preparation section.

FIG. 3 is a drawing to describe an example of processing in the reduced range block preparation section 666 (with use of projection). The reduced range block preparation section 666 projects and reduces all range block images each of 5×5 size generated by the range block extraction section 664 to reduced range block images each of 2×2 size, the same size as that of the domain block image.

For example, as shown in FIG. 3, the pixel values are weighted and added based on the area ratio when 5×5 size is projected to 2×2, whereby projection reduction is executed. Letting the pixel values of the 5×5 size be {Pij|i, j=1, 2, 3, 4, 5} and the pixel values of the 2×2 size after reduction be {Qij|i, j=1, 2}, Q11, Q21, Q12, and Q22 are given according to expression (1). To reduce 5×5 to 2×2, the result becomes the same value regardless of projection or linear interpolation or bilinear.

$$\begin{aligned}
Q11 &= (4*P11 + 4*P21 + 2*P31 + 4*P12 + 4*P22 + \\
&\quad 2*P32 + 2*P13 + 2*P23 + 1*P33)/25 \\
Q21 &= (2*P31 + 4*P41 + 4*P51 + 2*P32 + 4*P42 + \\
&\quad 4*P52 + 1*P33 + 2*P43 + 2*P54)/25 \\
Q12 &= (2*P13 + 2*P23 + 1*P33 + 4*P14 + 4*P24 + \\
&\quad 2*P34 + 4*P15 + 4*P25 + 2*P35)/25 \\
Q22 &= (1*P33 + 2*P43 + 2*P53 + 2*P34 + 4*P44 + \\
&\quad 4*P54 + 2*P35 + 4*P45 + 4*P55)/25
\end{aligned} \quad (1)$$

Figure 4:
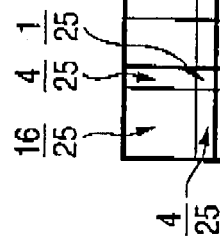
FIG. 4 is a drawing to describe an example of processing in an enlarged pseudo domain block preparation section (with use of projection)

FIG. 4 is a drawing to describe an example of processing in the enlarged pseudo domain block preparation section 670 (with use of projection). The enlarged pseudo domain block preparation section 670 uses the area ratio when the most similar range block image of 5×5 size selected by the similarity degree determination section 668 is projected to enlarged domain block size rD (enlarged domain block) =4×4 size, and weights and adds the pixel values based on the area ratio when 5×5 size is projected to 4×4 in the same manner as the method used in the reduced range block preparation section 666, for example, as shown in the figure, thereby performing calculation of projection reduction.

Letting the pixel values of the 5×5 size be {Pij|i, j=1, 2, 3, 4, 5} and the pixel values of the 4×4 size after reduction be {Qij|i, j=1, 2, 3, 4}, the pixel values after reduction are given according to expression (2). To reduce 5×5 to 4×4, the result also becomes the same value regardless of projection or linear interpolation or bilinear.

$$\begin{aligned}
Q11 &= (16*P11 + 4*P21 + 4*P12 + 1*P22)/25 \\
Q21 &= (12*P21 + 8*P31 + 3*P21 + 2*P32)/25 \\
Q31 &= (8*P31 + 12*P41 + 2*P32 + 3*P42)/25 \\
Q41 &= (4*P41 + 16*P51 + 1*P42 + 4*P52)/25 \\
Q12 &= (12*P12 + 3*P22 + 8*P13 + 2*P23)/25 \\
Q22 &= (9*P22 + 6*P32 + 6*P23 + 4*P33)/25 \\
Q32 &= (6*P32 + 9*P42 + 4*P33 + 6*P43)/25 \\
Q42 &= (3*P42 + 12*P52 + 2*P43 + 8*P53)/25 \\
Q13 &= (8*P13 + 2*P23 + 12*P14 + 3*P24)/25 \\
Q23 &= (6*P23 + 4*P33 + 9*P24 + 6*P34)/25 \\
Q33 &= (4*P33 + 6*P43 + 6*P34 + 9*P44)/25 \\
Q43 &= (2*P43 + 8*P53 + 3*P44 + 12*P55)/25 \\
Q14 &= (4*P14 + 1*P24 + 16*P15 + 4*P25)/25 \\
Q24 &= (3*P24 + 2*P34 + 12*P25 + 8*P35)/25 \\
Q34 &= (2*P34 + 3*P44 + 8*P35 + 12*P45)/25 \\
Q44 &= (1*P44 + 4*P54 + 4*P45 + 16*P55)/25
\end{aligned} \quad (2)$$

Figure 5:
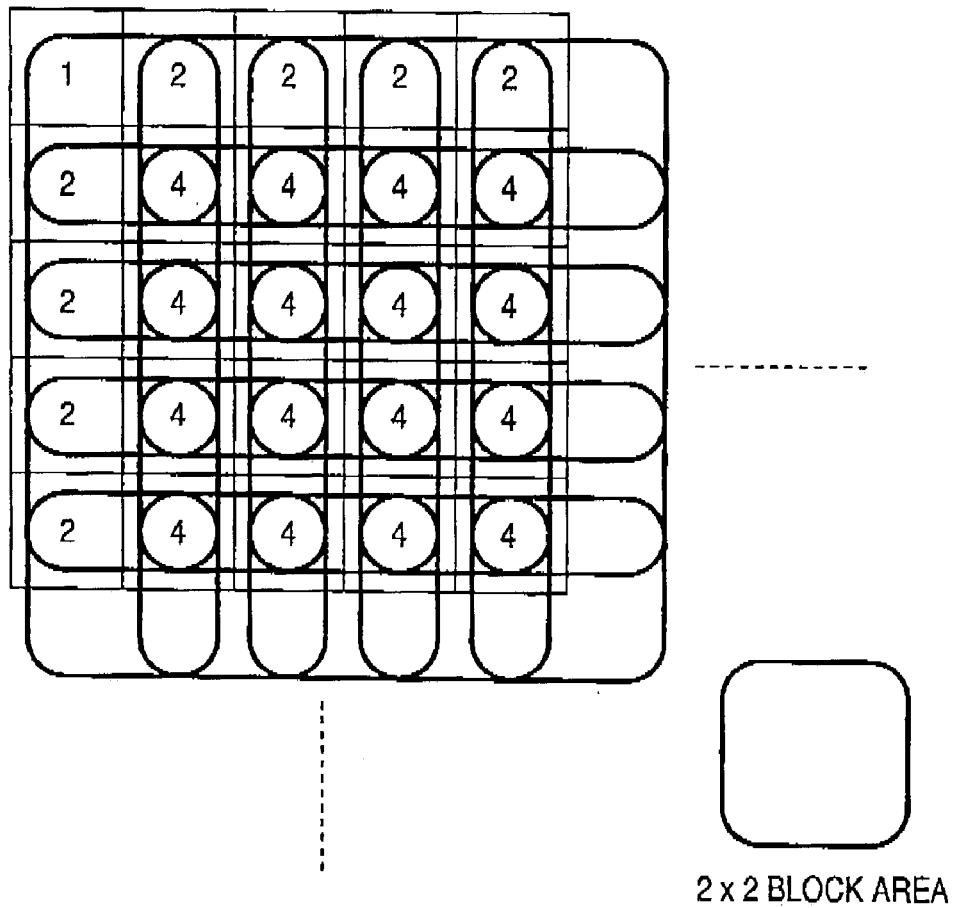
FIG. 5 is a drawing to show an example of overlap amounts of pixel values after enlargement when overlap processing is performed.

FIG. 5 is a drawing to show an example of overlap amounts of pixel values after enlargement when overlap processing is performed. Here, overlap processing of shifting domain block image one pixel in the main scanning direction or the subscanning direction is shown. According to the overlap processing, if domain block images are extracted and a procedure described later is executed for all domain block images, the domain block image overlap amounts in the original image become values as given in FIG. 5.

The overlap processing unit 686 projects the values to the correspondence positions in the enlarged image, divides the values entered in the enlarged image memory area of the image data storage section 54 by the values, and outputs the resultant image to the image output section 558 as an enlarged image after the nth iterated enlargement processing (called the nth enlarged image). When an additional iterated processing instruction is given from the iterated processing control section 672, the nth enlarged image is input to the range block extraction section 664.

Figure 6:
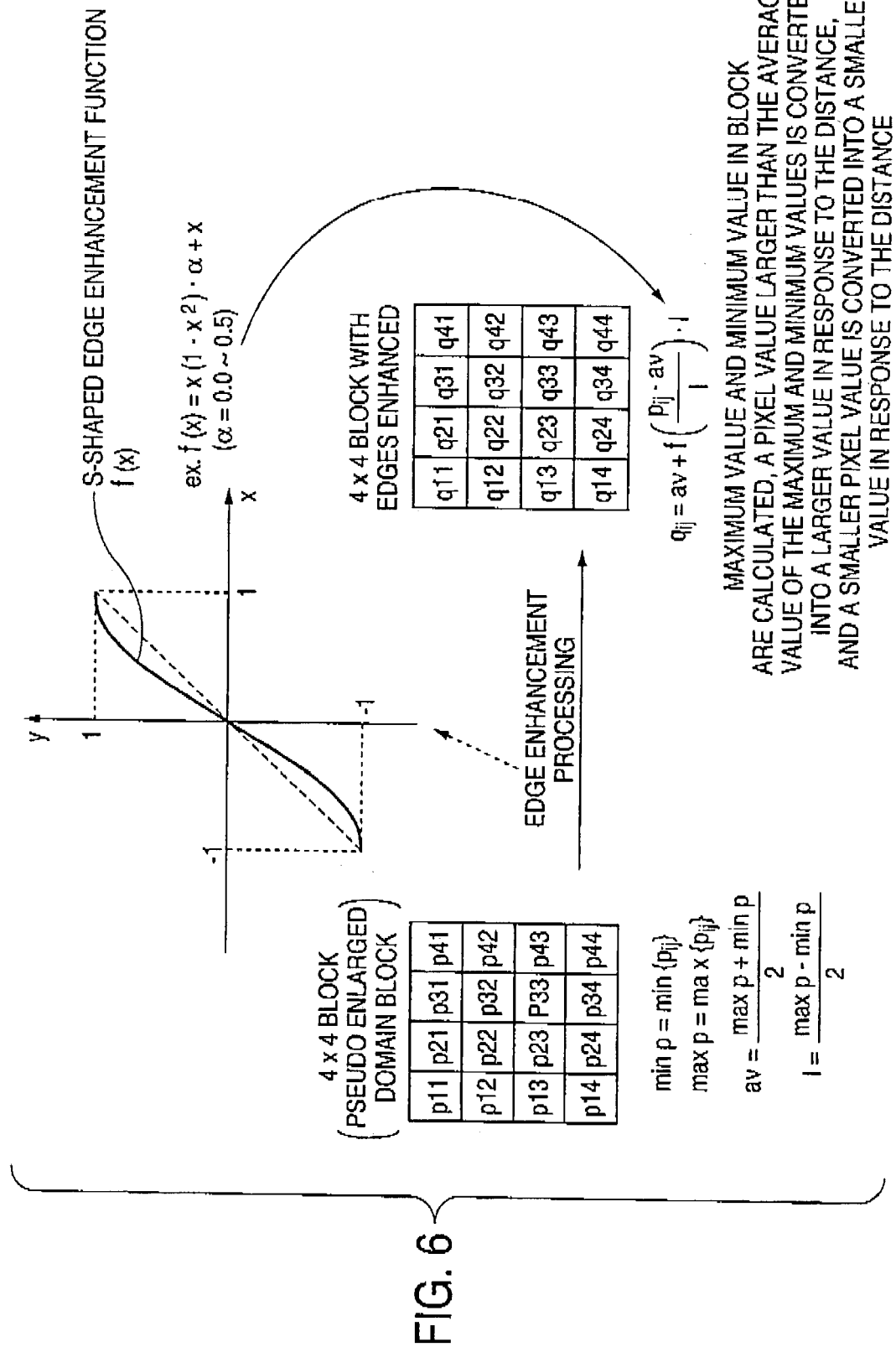
FIG. 6 is a drawing to describe an example of processing in an edge enhancement processing section.

FIG. 6 is a drawing to describe an example of processing in the edge enhancement processing section 671. Here, for 4×4 block {Pij|i, j=1, 2, 3, 4}, pixel minimum value minp, pixel maximum value maxp, average value av as an evaluation index value, and median value 1 are set as in the following expression (3):

$$\left.\begin{array}{l}\min p = \min\{pij\}\\ \max p = \max\{pij\}\\ av = (\max p + \min p)/2\\ l = (\max p - \min p)/2\end{array}\right\} \quad (3)$$

At this time, edge enhancement pixel value qij (i, j=1, 2, 3, 4) is obtained according to the following calculation expression (4). Expression (4) means that the maximum value and the minimum values in block are calculated, a pixel value larger than the average value of the maximum and minimum values is converted into a larger value in response to the distance, and a smaller pixel value is converted into a smaller value in response to the distance.

$$qij=av+f((pij-av)/l)*l \quad (4)$$

Here, a function shaped like a letter S with an origin O as the center as shown in FIG. 6 is used as the edge enhancement function f. For example, a function of expression (5) can be used. Any other function can also be used as f(x), and edge enhancement parameters can be defined unique to each function.

$$f(x)=x(1-x*x)*\alpha+x(\alpha=0.0 \text{ to } 0.5) \quad (5)$$

Use of expression (5) means that the pixel values in block are converted according to the nonlinear function for enhancing edges. The variable α is a parameter for defining the strength of edge enhancement, in which case it can take a value ranging from 0.0 to 0.5. Adjustment is made in the range of α=0.0 to 0.5, whereby the degree of edge enhancement can be controlled. As α is increased, the S letter shape of the function is built up and thus edges can be made sharper. If a is set to 0.0, substantially edge enhancement is not conducted and when α is set to 0.5, the strongest edge enhancement effect is given.

Use of expression (5) means that a larger pixel value than the average value in block is converted into a larger value and a smaller pixel value is converted into a smaller value. Therefore, in the next iterated processing, brightness value conversion according to the least squares method is again performed for the block with the edges enhanced, so that only the edge portions are enhanced and other portions are not affected.

Figure 7:
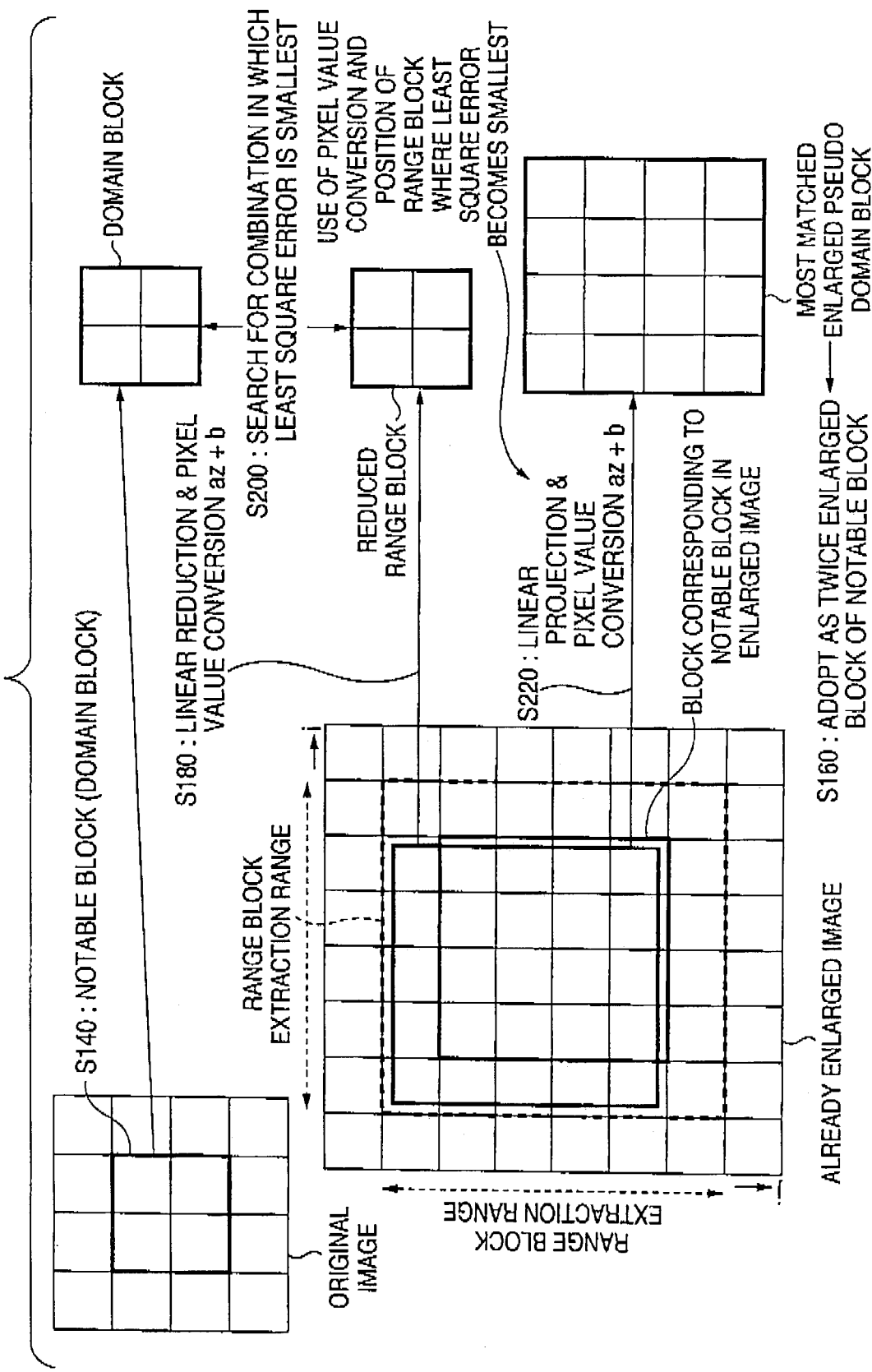
FIG. 7 is a drawing to show the relationships among domain block image, range block image, reduced range block image, and enlarged pseudo domain block image to be processed in the image processing apparatus of the first embodiment of the invention.

FIG. 7 is a drawing to show the relationships among domain block image, range block image, reduced range block image, and enlarged pseudo domain block image to be processed in the image processing apparatus 5 of the first embodiment. As shown in the figure, in the original image, a notable block of a predetermined pixel size is set as a domain block and a search block larger than the notable block is set as a range block. When the range block is set, in the embodiment, preferably a plurality of range blocks are set to the neighborhood of the portion corresponding to the notable block of an enlarged image at the specified magnification rather than the original image itself.

The degree of similarity between the domain block image and each range block image is examined, the range block having a higher degree of similarity (preferably the highest degree of similarity) is selected, pixel value conversion is executed as required, and the image is placed as the enlarged image corresponding to the notable block. That is, a search is made for a similar block from the surroundings of the position corresponding to the notable block of the enlarged image corresponding to the original image for each local block of the original image (collage). This processing is repeated for the whole Of the original image as the setup position of the notable image (namely, the domain block) is switched in order, whereby finally the image enlarged at the magnification set for the original image is provided.

Figure 8:
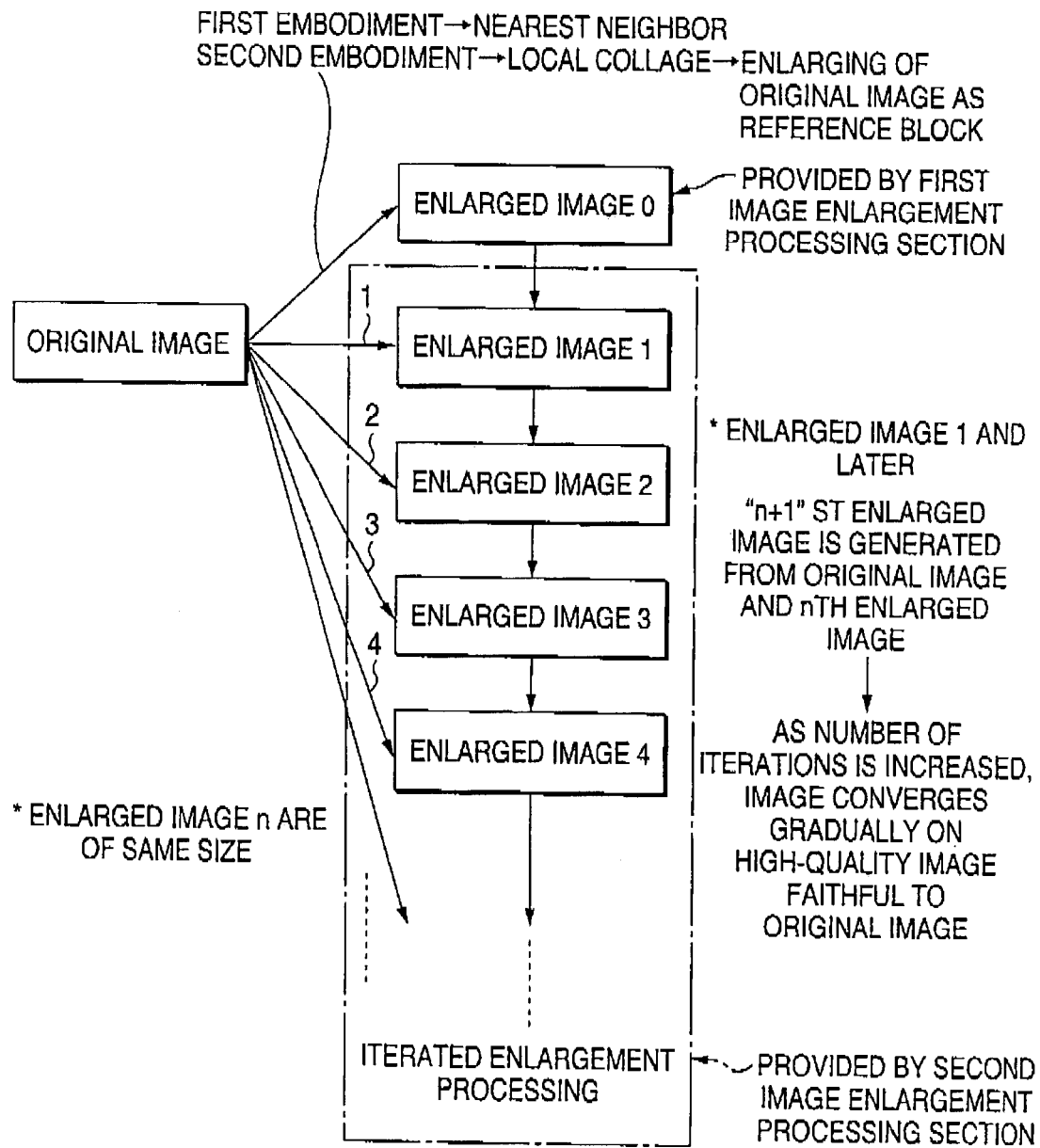
FIG. 8 is a drawing to describe an enlargement processing technique (whole flow)

FIG. 8 is a drawing to show the whole flow of the enlargement processing technique in the image enlargement processing section. Here, domain block image, range block image, reduced range block image, and enlarged pseudo domain block image are set with the relationships as shown in FIG. 7, one enlarged image is generated for each time, and this process is repeated n times. That is, first the first image enlargement processing section 560 generates enlarged image 0 as an initial enlarged image. The range block extraction section 664 extracts range blocks from the enlarged image 0 and other functional sections perform predetermined processing, thereby generating first enlarged image 1 from the original image and 0th enlarged image 0. After this, an "n+1"st enlarged image is generated from the original image and the nth enlarged image. That is, the enlarged image is used as a local nearby block and the same processing is repeated. At this time, a coefficient for sharpening the edges is multiplied as previously described with reference to FIG. 6. Accordingly, as the number of iterations is increased, while the edges become sharper, the image converges gradually on a high-quality image faithful to the original image.

Figure 9:
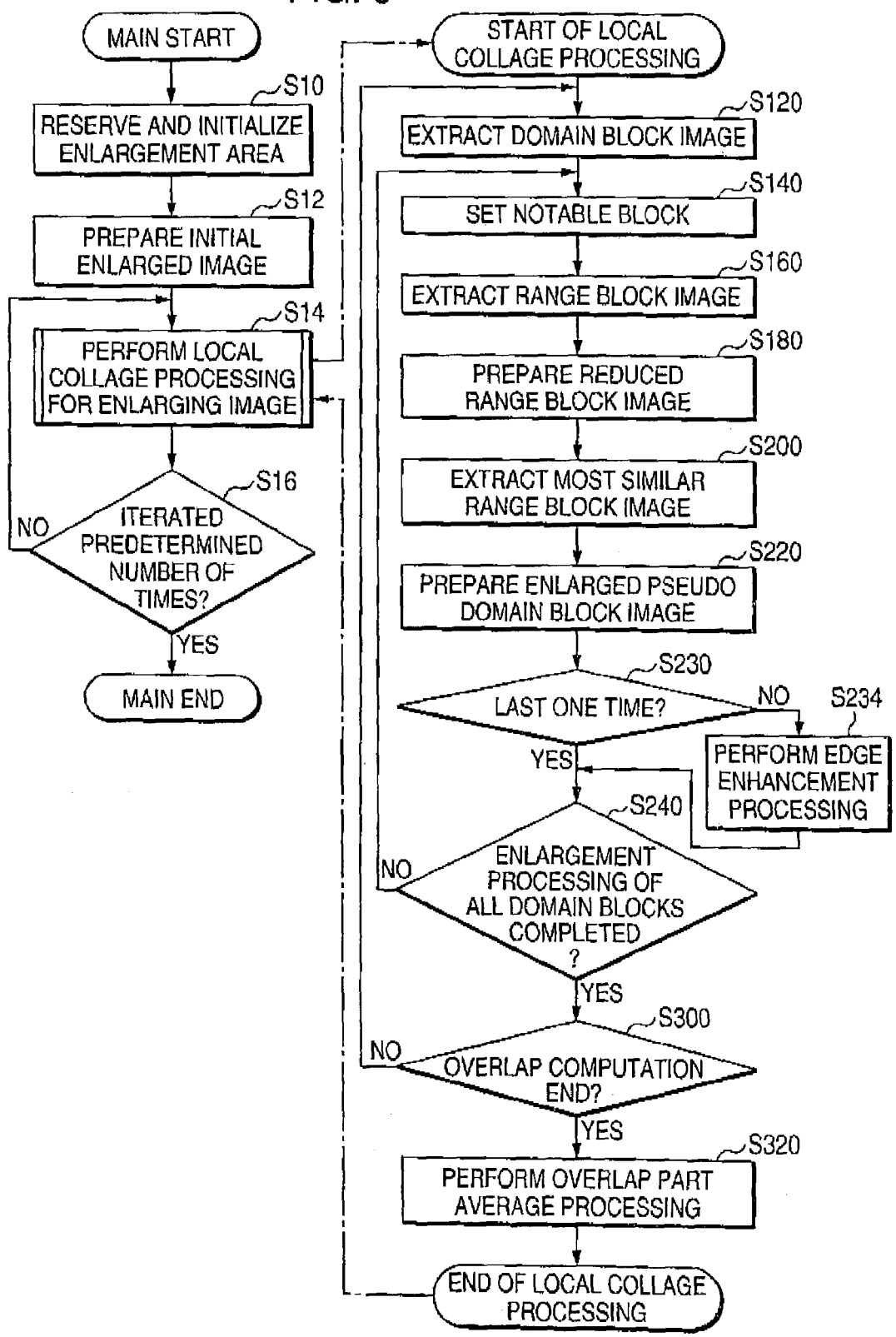
FIG. 9 is a flowchart to show an example of a processing procedure focusing attention on the image enlargement processing in the image processing apparatus of the first embodiment of the invention.

FIG. 9 is a flowchart to show an example of a processing procedure in the image processing apparatus 5 of the first embodiment, particularly a processing procedure focusing attention on the image enlargement processing in the second image enlargement processing section 660. The processing procedure will be discussed also with reference to FIGS. 7 and 8.

To begin with, to start enlargement processing, it is assumed that the image data to be processed, acquired by the image data acquisition section 52 is already stored in the memory section 554. Then, the image enlargement processing section 55 first reserves a memory area for an r-times (in the example, twice) enlarged image in the memory section 554, and initializes the area to "0" (S10) as preparation for iterated enlargement processing. It also reserves a template memory area of the same size as the twice enlarged image size and initializes the area to "0."

The image enlargement processing section 55 sets initial parameters. The initial parameters include, for example, enlargement ratio, block image size of image read, the number of computation processing times to perform overlap processing, image read start offset for each processing, the number of local collage processing iterations n, and the like. In the embodiment, the parameters are set as follows: Enlargement ratio=twice, domain block image size=2×2 pixels, range block image size=3×3 pixels, horizontal offset of image read start=one pixel, vertical offset of image read start=one pixel, the number of overlap computation processing times=two (main), two (sub), and the number of iterations n=5.

Next, the first image enlargement processing section 560 enlarges twice the original image stored in the memory section 554 according to the nearest neighbor to generate initial twice enlarged image data and stores the data in twice enlarged image memory (S12). Next, the second image enlargement processing section 660 starts the first enlargement processing, namely, image enlargement processing of local collage processing (S14).

First, the domain block extraction section 662 extracts all domain block images each of 2×2 Size from the original image (S120) and selects any one from among the domain block images as a notable block image (S140), as shown in FIG. 7.

Next, the range block extraction section 664 extracts a range block image of 5×5 size so as to include the 4×4 block in the twice enlarged image memory corresponding to the notable block image from the twice enlarged image (S160). Specifically, as shown in FIG. 7, the range block extraction section 664 extracts all range block images of 5×5 size containing at least one pixel of a position, the position where the pseudo enlarged block is to be placed in the initial enlarged image corresponding to the position of the notable block image, from the block image of surrounding 6×6 size, for example, surrounding the domain block image (notable block image). Thereby, in the example, four range block images in total are extracted by the range block extraction section 664.

Then, as shown in FIG. 3, the reduced range block preparation section 666 uses projection or linear interpolation or bilinear to reduce all range block images of 5×5 size selected by the range block extraction section 664 to generate reduced range block images of 2×2 size (S180).

Next, the similarity degree determination section 668 compares each reduced range block image with the domain block image to determine the degree of similarity therebetween. For example, pixel value conversion is performed for each reduced range block image generated by the reduced range block preparation section 666, the reduced range block image having the pixel values and pattern most similar to those of the domain block image is selected, and the range block image corresponding to the reduced range block image, namely, the range block image on which the selected reduced range block image is based is adopted as the most similar range block image (S200).

For example, as for pixel values d11, d21, d12, and d22 of the domain block image, pixel average value Dv=(d11+d21+d12+d22)/4 and pixel standard deviation $VDv=\Sigma(dij-Dv)^2$ ("^" denotes exponentiation and ij denotes pixel position) are found. Next, as for pixel values r11k, r21k, r12k, and r22k of every reduced range block image (k denotes reduced range block image; k=1, ..., 4), pixel average value Rvk=(r11k+r21k+r12k+r22k)/4 and pixel standard deviation $VRvk=\Sigma(rijk-Rvk)^2$ are found.

Next, conversion coefficients ak and bk and conversion error $Ek=\Sigma(dij-ak*rijk-bk)^2$ in least square approximation of the pixel values of reduced range block image to the pixel values of the domain block image corresponding to the corresponding notable block in first-order conversion or linear transformation az+b are found. In the least squares method, ak, bk, and Ek can be found directly according to the following calculation expression (6):

$$\left. \begin{array}{l} ak = \left(\sum (rijk - Rvk)*(dij - Dv)\right)/VRvk \\ bk = Dv - ak*Rvk \\ Ek = VDv - ak*ak*VRvk \end{array} \right\} \quad (6)$$

A given limitation is placed on the value of ak across the board regardless of the degree of complexity of the image in the range block image of 5×5 size. Here, the following conditional expression (7) is used:

$$-10 \leq ak \leq 10 \quad (7)$$

Alternatively, the degree of complexity of the range block image determined by the complexity degree determination section 669 may be referenced for determining the degree of complexity. For example, a limitation may be placed on the allowable value of ak in response to the degree of complexity of the image in the range block image. When the image in the range block image is complicated and contains much high-frequency component, if it is adopted as range block image, a false component occurs in the enlarged image and thus preferably as the image is complicated, the reference degree to the image should be lessened.

Next, whether or not each ak (k=1, ... 4) is contained in the allowable value range mentioned above is checked. Only those contained in the range are collected to a set G. Next, E=min {Ek|k ∈G} is set and a=ak and b=bk are set for k with E=Ek. The range block pointed to by the k is most similar to the domain block.

In fact, bk is not required for determining Ek and thus after k with Ek becoming the minimum is found and finally ak is determined, bk may be calculated. As the bk value, the following expression (8) having the effect of superposing an error with domain block for each pixel in block rather than the constant value of the expression given above can also be used:

$$bk=bijk=dij-ak*rijk \quad (8)$$

If bk is previously calculated according to expression (8), reproducibility of the original image can be furthermore enhanced. The reason why bijk is described is that the value varies from one pixel to another in the domain block. In the embodiment, bk is determined based on expression (8) considering the change amount for each pixel in the latter.

Next, the enlarged pseudo domain block preparation section 670 uses a known technique, such as linear interpolation or bilinear or projection, to project and reduce the most similar range block image of 5×5 size selected in the similarity degree determination section 668 to the enlarged domain block size, namely, 4×4 size to prepare an enlarged pseudo domain block image (S220). For example, the most similar range block image of 5×5 size is projected to the 4×4 size. At this time, the enlarged pseudo domain block preparation section 670 may calculate using the area ratio when the original 5×5 block is projected to 4×4 as shown in FIG. 4 in the same manner as the method used in the reduced range block preparation section 666.

Next, the pixel values of the image projected to the 4×4 size are again converted based on the relationship between the domain block image and the range block image to prepare an enlarged pseudo domain block image, and the result is adopted as twice enlarged 4×4 block of 2×2 domain block (enlarged pseudo domain block). For example, for all pixels z of 4×4 block, pixel value conversion az+b is performed according to conversion coefficients a and b found in the similarity degree determination section 668, and the result is adopted as enlarged pseudo domain block of 2×2 domain block. All pixel values of the 4×4 block are added to the domain block correspondence location of the enlarged image memory area in the memory section 554.

If an error is superposed on the bk value in the similarity degree determination processing in the similarity degree determination section 668, in the enlargement process, bk assigned to each dot position of the domain block image is projected and is switched for each dot.

Next, the iterated processing control section 672 determines whether or not the current local collage processing is at the last time (S230). If the number of iterations does not equal the initially setup number of iterations, namely, if the current local collage processing is not at the last time, the edge enhancement processing section 671 is commanded to perform edge enhancement processing (NO at S230). On the other hand, if the current local collage processing is at the last time, edge enhancement processing is passed (YES at S230).

Upon reception of command from the control section 552, the edge enhancement processing section 671 performs edge enhancement processing for the 4×4 enlarged pseudo domain block image provided by the enlarged pseudo domain block preparation section 670 (S234). For example, as shown in FIG. 6, the edge enhancement processing section 671 increases a larger pixel value than intermediate value av of the pixel values in the block and decreases a smaller pixel value than av, thereby performing edge enhancement processing. A 4×4 block image resulting from performing edge enhancement for the 4×4 enlarged pseudo domain block image is output and is added to the correspondence position of template image.

Next, the iterated processing control section 672 determines whether steps S120 to S234 have been performed for all domain block images (S240). If a domain block image not subjected to the processing exists, control returns to step S140, a notable block image is set to the domain block image, and steps 160 to S234 are repeated (NO at S240). On the other hand, if steps S120 to S234 have been performed for all domain block images (YES at S240), the enlarged image corresponding to the original image is stored in the enlarged image data storage section 58 and the enlarged image is updated.

Next, if steps S120 to S234 have been performed for all domain block images (YES at S240), the overlap processing unit 686 checks the number of computation times of overlap processing (S300). If it is less than the setup number of computation times, the processing starting at step S120 is again started at the position of adding the image read start offset to the top address of image (NO at S300). That is, whenever control returns to step S120, the domain block extraction section 662 adds the image read start offset, reads domain block images in the setup domain block image size from the position of adding the offset to the top address of image stored in the image data storage section 54, and sets any of the read domain block images to a notable block image. After this, other sections repeat similar processing to that described above.

On the other hand, if the number of computation times of overlap processing is set to two or more and the number of times the above-described processing has been performed reaches the setup number of overlap computation times (YES at S300), the overlap processing unit 686 performs average processing of referencing the pixel weighting shown in FIG. 5, finding the average value of image duplicately processed (overlap part) accompanying the overlap processing, and adopting the found value as the value of the pixel (S320). The value is projected to the correspondence position in the template image, the value entered in the template image memory area is divided by the value, and the resultant image is stored in the enlarged image memory for update. The first time of image re-enlargement processing (iterated enlargement processing) of local collage is now complete.

When the number of computation times of overlap processing is set to one, namely, overlap processing is suppressed, the average processing is not required and one enlarged image read from the enlarged image data storage section 58 is output intact. That is, only when execution of overlap processing is set, the second image enlargement processing section 660 shifts the block image read start position by an arbitrary value relative to the original image, performs enlargement processing more than once, and adopts the average value as pixel data for duplicate (overlap) pixels, thereby providing the final enlarged image. Accordingly, block image distortion can be reduced.

Next, the iterated processing control section 672 determines whether or not the number of iterations reaches the predetermined number of times n (S16). If the predetermined number of times is not reached, the iterated processing control section 672 commands the domain block extraction section 662, the overlap processing unit 686, etc., to iterate the processing using the twice enlarged image prepared by the collage processing (NO at S16).

Figure 10:
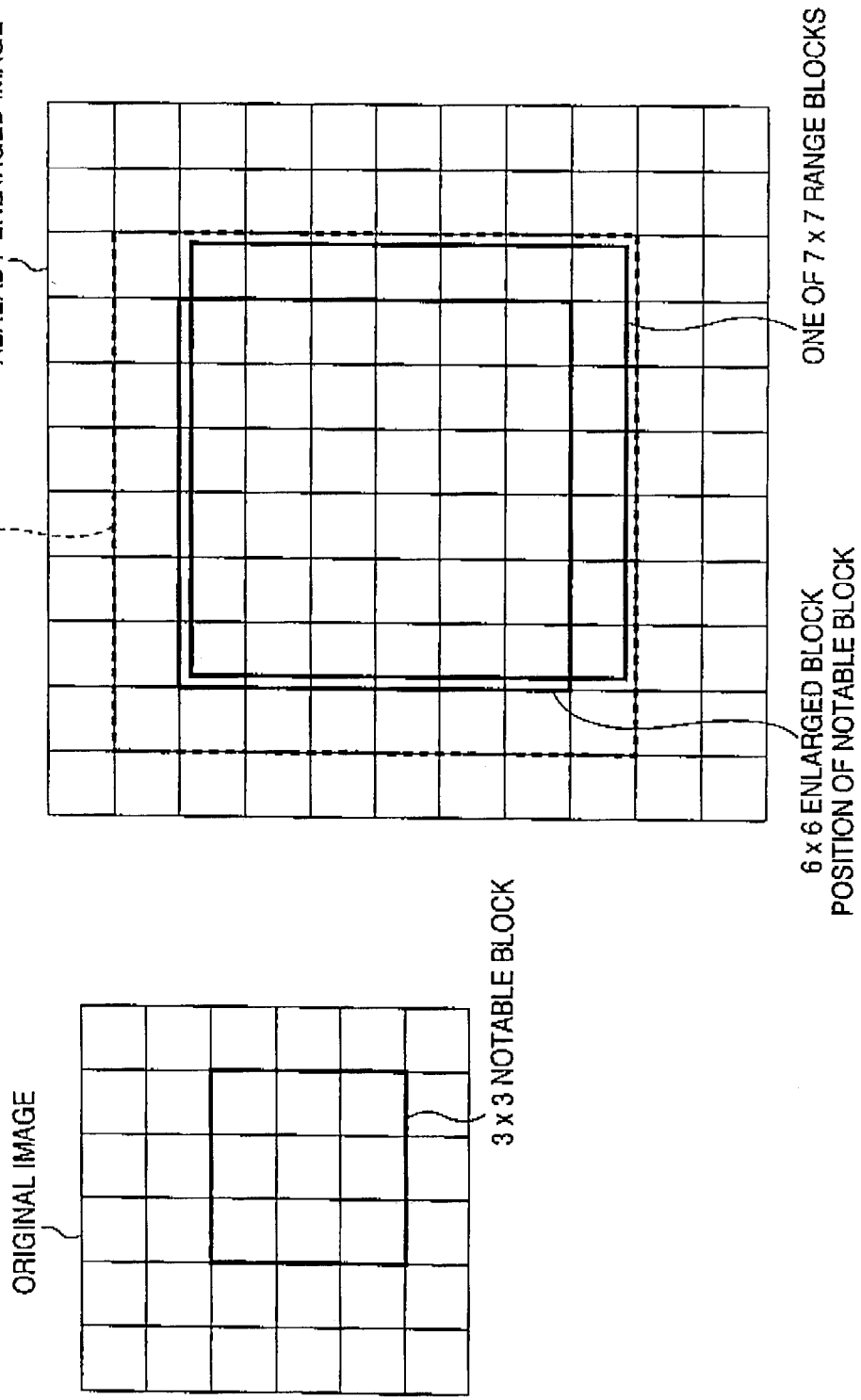
FIG. 10 is a drawing to show an example of selecting 7×7 range blocks from a reference image (enlarged image) with respect to a 3×3 domain block.

In the iterated processing, the domain block size and the range block size need not be set to the same as those at the first time and may be changed. Here, the domain block size is set to 3 and the range block size is set to 7. The again setup domain block size and range block size, the original image, and the enlarged image provided in the first enlargement (already stored in the enlarged image memory) are used to again perform the above-described collage processing. At this time, four types of 7×7 range blocks containing 6×6 pixels on the enlarged image corresponding to the 3×3 domain block on the original image can be taken as shown in FIG. 10.

The enlarged image used in the second enlargement is already subjected to the edge enhancement processing of the edge enhancement processing section 671 and thus the density of the original image is not faithfully reproduced. However, the original image is approximated again by the least squares method in the second enlargement and thus a density correction is made at the time. Consequently, the density characteristic of the original image can be faithfully reproduced while the edges are made sharp. Upon completion of the second iteration, then the third iteration, the fourth iteration, . . . , are executed. In the example, the first to fourth iterations (a total of five times of collage processing) are executed. At this time, block size combinations and the edge enhancement parameter as listed in Table 1 given below are used;

TABLE 1

|  | Domain block size | Range block size | α |
| --- | --- | --- | --- |
| First time | 2 | 5 | 0.2 |
| Second time | 3 | 7 | 0.2 |
| Third time | 3 | 7 | 0.2 |
| Fourth time | 3 | 6 | 0.2 |
| Fifth time | 3 | 6 | 0.0 |

Preferably, the edge enhancement parameter of the last fifth iteration is always set to 0.0. The reason why the parameter is set to 0.0 is that if the pixel values resulting from performing least square approximation of the original image are not used at the termination of the last iteration, the density characteristic becomes different from that of the original. If edge enhancement is not executed at the last fifth time, the edges are already reproduced sufficiently to be sharp by the four iterations. This means that the edge parts can be enlarged sharply.

In the first embodiment, sharpness of edges can be built up not only by the fractal technique, but also by the block size ratio of 2D£R0, the edge enhancement processing, and the iterated processing while referencing the once enlarged image. In addition, noise can also be removed as the iterated processing is performed, and a very high-quality enlarged image can be generated. Particularly in the first to third enlargement, the relation of 2D<R0 holds between the domain size D and the range size R0, and projection reduction of R0–>2D is performed in the enlarged pseudo domain block preparation processing in the enlarged pseudo domain block preparation section 670.

That is, the R0 size block larger than the actually required 2D size is adopted and is reduced to the 2D size and thus the effect of particularly making it possible to easily concatenate obscure thin lines on the original image on the enlarged image can be provided and consequently the element of restoration rather than simple enlargement can be added.

In the processing procedure of the first embodiment, the domain block size D is set to 3 and the range block size R0 is set to 6 in the fourth enlargement and thus if a range block is selected so as to contain a block on the enlarged image corresponding to the domain block, only one can be taken.

Figure 11:
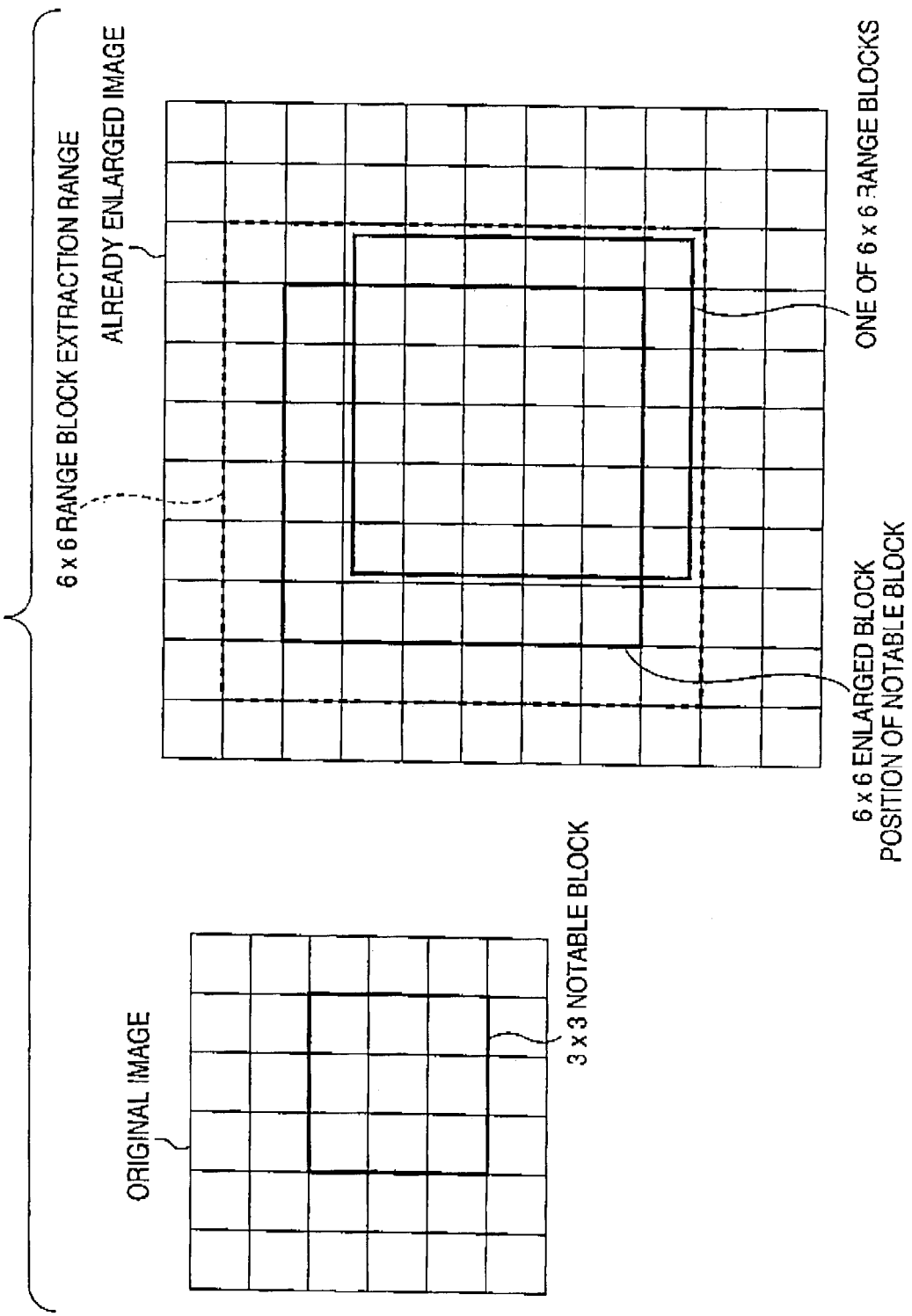
FIG. 11 is a drawing to show an example of selecting 6×6 range blocks from a reference image (enlarged image) with respect to a 3×3 domain block.

In such a case, as shown in FIG. 11, a frame of width 1 may be put on the enlarged image corresponding to the domain block, and a total of nine 6×6 blocks contained therein may be referenced. In the first embodiment, doing so at the fourth time, the image already sufficiently converges at the fifth time and thus the block itself on the enlarged image corresponding to the domain block is adopted as the range block. That is, in this case, search for the block where the least square error becomes the minimum is not substantially made. Of course, in every block size combination, a frame of width n may be put on the surrounding of the block on the enlarged image corresponding to the domain block and the range blocks may be referenced from the inside.

Figure 12:
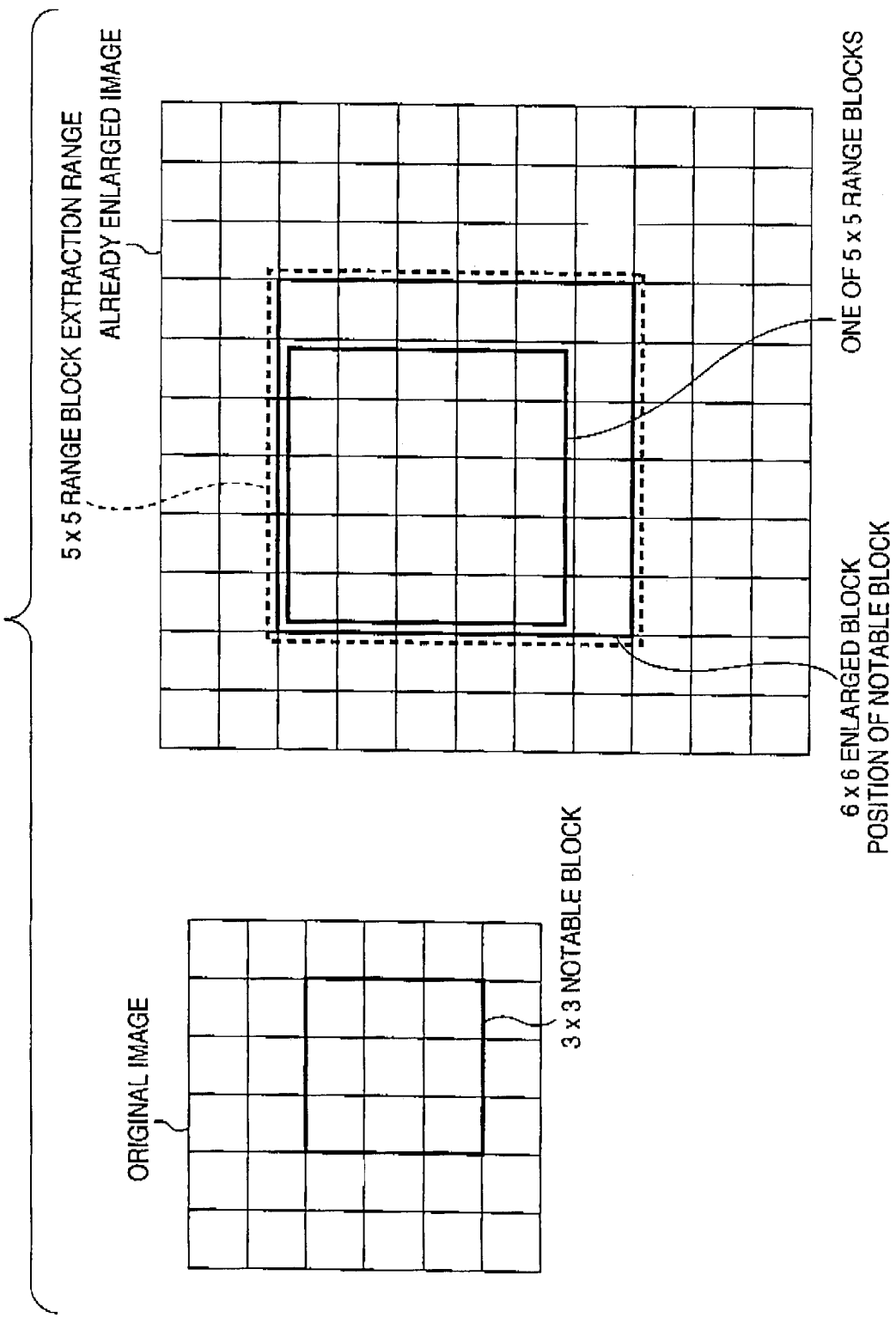
FIG. 12 is a drawing to show an example of selecting 5×5 range blocks from a reference image (enlarged image) with respect to a 3×3 domain block.

If the range block size R0 is smaller than the enlarged pseudo domain block size D, for example, if the domain block size D is 3 and the range block size R0 is 5, range blocks may be selected only from the inside of the block on the enlarged image corresponding to the domain block, as shown in FIG. 12. Generally, the enlargement technique can select range blocks sufficiently well approximated if search is made for range blocks in a very small range.

In the first embodiment, both domain and range blocks are squares, but either or both of domain and range blocks may be made rectangular, of course. For example, the range block 3×4 may be adopted for the domain block size 2×3 or the range block 4×4 may be adopted for the domain block size 2×3.

The edge enhancement parameter α may be switched for each block. For example, the parameter may be set to a large value where the value of the domain block standard deviation VDv is large (for example, an edge part, etc.,); the parameter may be set to a small value or 0.0 where the value of the standard deviation VDv is small (for example, a flat part, etc.,). This means that the edge enhancement parameter α may be switched in response to the edge degree. Accordingly, only the edge parts can be enhanced efficiently, resulting in a more appropriate image.

If the edge enhancement parameter α is set to 0.0, the processing routine is executed although the edges are not actually enhanced, and the processing speed is not improved. Therefore, preferably the edge enhancement processing routine is skipped instead of setting the edge enhancement parameter a to 0.0, whereby the processing speed is improved. This also applies to the case where the edge enhancement parameter α is set to 0.0 in other embodiments.

Figure 13:
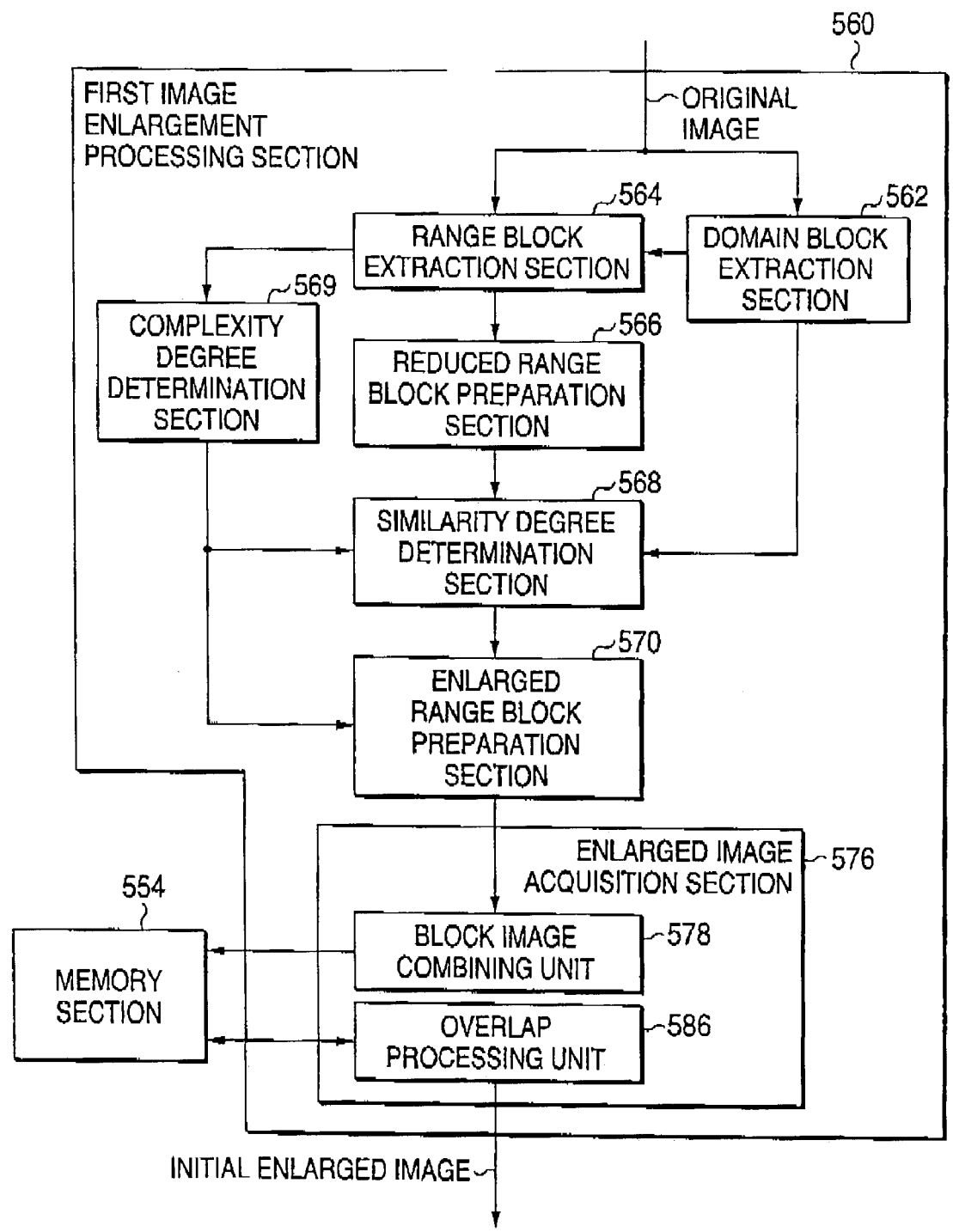
FIG. 13 is a diagram to describe a second embodiment of image enlargement processing section and is a block diagram to show details of a first image enlargement processing section.

FIG. 13 is a diagram to describe a second embodiment of image enlargement processing section 55 and is a block diagram to show details of a first image enlargement processing section 560.

The first image enlargement processing section 560 of the second embodiment is a functional section for performing image enlargement processing proposed in Japanese Patent Application No. 2001-341432 by the applicant of the invention. The first image enlargement processing section 560 uses a technique of combining the concepts of fractal enlargement and linear, interpolation or bilinear, searching for a range block of an intermediate size between the domain block size and the post-enlarged domain block size according to a fractal technique, and enlarging the range block to the objective enlarged domain block size by linear interpolation or bilinear, thereby reproducing sharp step edges by the fractal enlargement and reproducing an image with less texture part crush by the linear interpolation or bilinear.

The image enlargement processing of the second embodiment uses the enlargement processing proposed in Japanese Patent Application No. 2001-341432 as a function section for preparing an initial twice enlarged image. In the enlargement processing of the first image enlargement processing section 560, the point of leaving some blurring in the whole of the enlarged image is corrected as a second image enlargement processing section 660 performs enlargement processing, whereby while occurrence of image quality degradation caused by noise, jaggies, block distortion, etc., is prevented, edge parts are enlarged more sharply than those in the related art.

The first image enlargement processing section 560 has a basic configuration similar to that of the second image enlargement processing section 660 although it does not comprise an edge enhancement processing section 671 or an iterated processing control section 672. Functional parts of the second image enlargement processing section 660 corresponding to those of the first image enlargement processing section 560 are denoted by reference numerals 5 so as to correspond to reference numerals 6. However, the first image enlargement processing section 560 differs from the second image enlargement processing section 660 in processing as described later. The first image enlargement processing section 560 and the second image enlargement processing section 660 may share the corresponding functional parts for making the circuit scale compact without providing the first and second image enlargement processing sections as separate bodied. The difference between the first image enlargement processing section 560 and the second image enlargement processing section 660 will be discussed.

To begin with, a range block extraction section 564 selects as a range block image, an MR1×NR1 (in the correspondence with the above-given example, 3×3) block containing an MD1×ND1 (in the above-given example, 2×2) domain block in the original image extracted by a domain block extraction section 562. That is, while a range block extraction section 664 of the second image enlargement processing section 660 references a range block from a previously enlarged image, the range block extraction section 564 selects a range lock from the original image itself.

The range block extraction section 664 extracts a range block so as to satisfy the relation of $R0 \geq r*D$, but the range block extraction section 564 extracts a range block so as to satisfy the relation of $r*D>R1>D$. This means that the size R1 of the first block unit is larger than the size D of the first block unit and is smaller than the enlarged block unit provided by enlarging the size D (first block unit) at a preset enlargement ratio.

Figure 14:
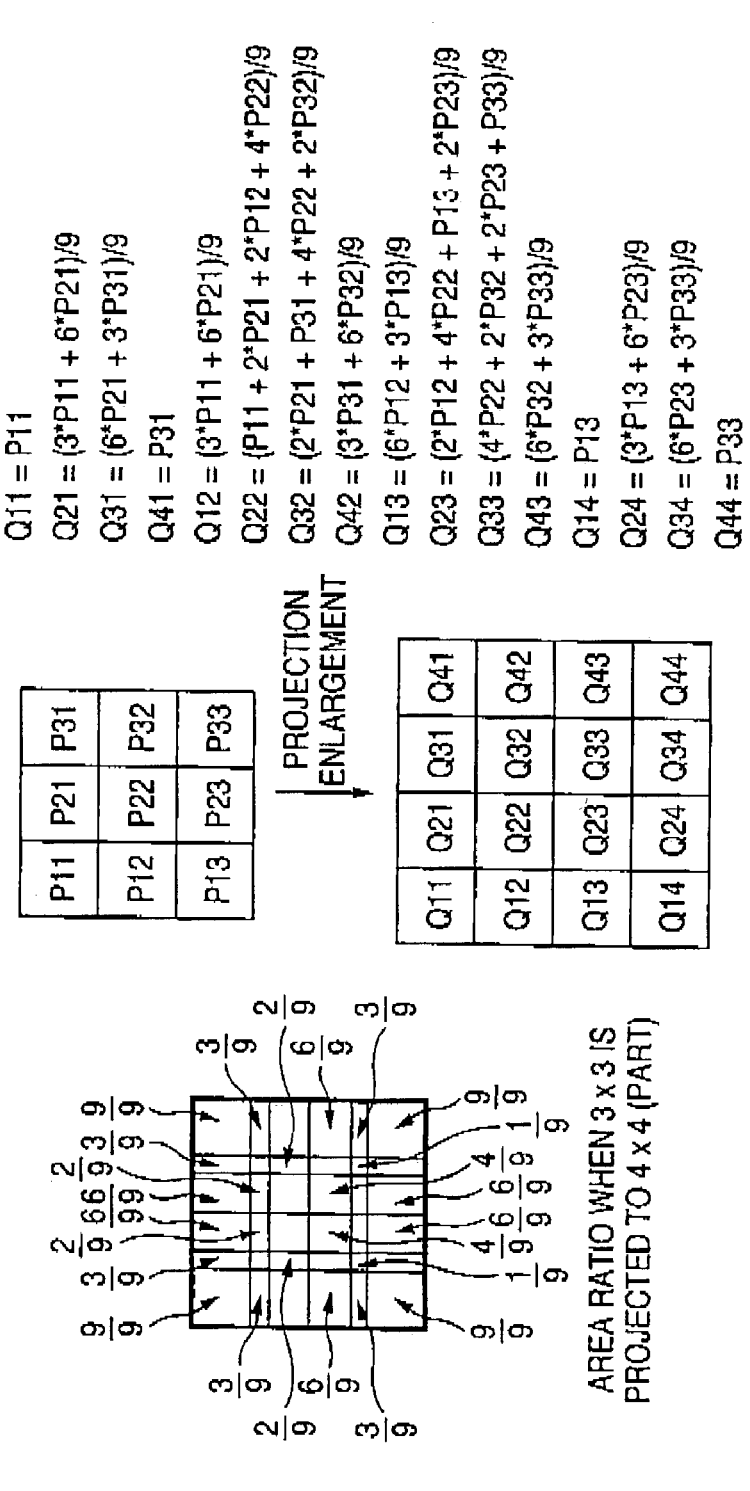
FIG. 14 is a drawing to describe an example of processing in an enlarged range block preparation section (with use of projection)

FIG. 14 is a drawing to describe an example of processing in an enlarged range block preparation section 570 (with use of projection). An enlarged pseudo domain block preparation section 670 projects a 5×5 range block image to 4×4 size for reduction. For the enlarged range block preparation section 570 to generate an initial twice enlarged image (0th enlargement processing), processing of enlarging a 3×3 range block image to 4×4 size becomes necessary. However, also in this case, projection, linear interpolation or bilinear, etc., may be used.

For example, the enlarged range block preparation section 570 uses the area ratio when the most similar range block image of 3×3 size selected by a similarity degree determination section 568 is projected to size rD=4×4 size, and weights and adds the pixel values based on the area ratio when 3×3 size is projected to 4×4, for example, as shown in the figure, thereby performing calculation of projection enlargement. Letting the pixel values of the 3×3 size be $\{Pij|i, j=1, 2, 3\}$ and the pixel values of the 4×4 size after enlargement be $\{Qij|i, j=1, 2, 3, 4\}$, the pixel values after enlargement are given according to expression (9). To enlarge 3×3 to 4×4, the result also becomes the same value regardless of projection or linear interpolation or bilinear.

$$\left.\begin{aligned}
Q11 &= P11 \\
Q21 &= (3*P11+6*P21)/9 \\
Q31 &= (6*P21+3*P31)/9 \\
Q41 &= P31 \\
Q12 &= (3*P11+6*P21)/9 \\
Q22 &= (P11+2*P21+2*P12+4*P22)/9 \\
Q32 &= (2*P21+P31+4*P22+2*P32)/9 \\
Q42 &= (3*P31+6*P32)/9 \\
Q13 &= (6*P12+3*P13)/9 \\
Q23 &= (2*P12+4*P22+P13+2*P23)/9 \\
Q33 &= (4*P22+2*P32+2*P23+P33)/9 \\
Q43 &= (6*P32+3*P33)/9 \\
Q14 &= P13 \\
Q24 &= (3*P13+6*P23)/9 \\
Q34 &= (6*P23+3*P33)/9 \\
Q44 &= P33
\end{aligned}\right\} \quad (9)$$

Since the first image enlargement processing section 560 does not have the functional part corresponding to the edge enhancement processing section 671, edge enhancement processing is not performed for the enlarged range block image generated by the enlarged range block preparation section 570. To adopt shared circuitry with the second image enlargement processing section 660, edge enhancement parameter α of the edge enhancement processing section 671 may be set to 0.0, as described earlier.

Other functional parts perform similar processing to that of the functional parts of the second image enlargement processing section 660. At the stage at which the twice enlarged image provided in the 0th enlargement processing of the first image enlargement processing section 560 is entered in enlarged image memory, the second image enlargement processing section 660 repeats steps S120 to S320 of the first embodiment with the same parameters as those of the first embodiment. Therefore, as a whole, the parameters listed in Table 2 given below are used through a total of five iterations in addition to the 0th enlargement processing. The term "original" enclosed in parentheses under range block size means referencing range blocks from the original image, and indicates processing in the first image enlargement processing section 560. The term "enlarged" means referencing range blocks from the "n−1"st enlarged image, and indicates processing in the second image enlargement processing section 660. This also applies to other tables given later.

TABLE 2

|  | Domain block size | Range block size | α |
|---|---|---|---|
| 0th time | 2 | 3 (original) | 0.0 |
| First time | 2 | 5 (enlarged) | 0.2 |
| Second time | 3 | 7 (enlarged) | 0.2 |
| Third time | 3 | 7 (enlarged) | 0.2 |
| Fourth time | 3 | 6 (enlarged) | 0.2 |
| Fifth time | 3 | 6 (enlarged) | 0.0 |

According to the second embodiment, the initial 0th enlargement processing is performed by the method proposed in Japanese Patent Application No. 2001-341432 by the applicant of the invention rather than nearest neighbor, so that good image quality is already provided at the 0th time stage. That is, jaggy occurrence is suppressed and an enlarged image less blurred is provided in the process of generating the initial twice enlarged image and at the same time, occurrence of noise-like garbage and fine-split-like pixel value staining in a step edge part can be prevented. Further, the second image enlargement processing section 660 at the later stage generates an enlarged image by iterating local collage processing, so that edge parts can be enlarged sharply and the image can be converged on a more ideal image.

In the enlargement processing of the first image enlargement processing section 560 in the second embodiment, other modifications proposed in Japanese Patent Application No. 2001-341432 can be applied in addition to the processing described in the second image enlargement processing section 660 of the first embodiment, needless to say. Other modifications proposed in Japanese Patent Application No. 2001-341432 may be applied to the second image enlargement processing section 660.

Next, a third embodiment of image enlargement processing will be discussed. Here, an image enlargement processing section 55 comprises a first image enlargement processing section 560 as in the second embodiment.

In the third embodiment, block size change processing of separating edge and texture parts is performed in addition to change in the enlargement block size, edge enhancement parameter a, and the number of iterations in the second embodiment. To begin with, the original image is enlarged twice with basic parameters listed in Table 3 given below in a similar manner to that in the second embodiment:

TABLE 3

|  | Domain block size | Range block size | α |
|---|---|---|---|
| 0th time | 3 | 4 (original) | 0.0 |
| First time | 3 | 5 (enlarged) | 0.4 |
| Second time | 3 | 6 (enlarged) | 0.4 |
| Third time | 3 | 6 (enlarged) | 0.0 |

In the third embodiment, the number of iterations is reduced to three, because the 0th image is previously prepared with high quality according to a similar technique to that in the second embodiment rather than nearest neighbor and thus the number of iterations required for the image to converge may be lessened. The edge enhancement parameter α is taken large as "0.4" or sufficiently sharpening the edges with a small number of iterations.

In the third embodiment, as the relation between domain size D and range size R0, the relation of 2D≧R0 is satisfied and particularly at the 0th time and the first time, 2D>R0. To use such parameters, when an R0 size range block is projected to an enlarged pseudo domain block of 2D size, enlargement processing of projection is performed. At this time, proper blurring is added and thus particularly in a texture part, unnatural dot concatenation does not appear and good reproduction can be provided. In a step edge part, blurring once occurs as the projection enlargement is executed, but the edge part is sharpened by the immediately following edge enhancement processing (with the parameter set to a high value), so that the step edge part is not degraded (jaggies and blurring do not occur).

In the first embodiment, the block size of 2D<R0 is selected and thus restoration of a thin line is high, but disadvantage in that busy pattern concatenation in the texture part is made intentionally, resulting in unnatural appearance on the enlarged image may appear. In contrast, in the method according to the third embodiment, the balance between the texture part and the step edge part becomes better as compared with the first embodiment.

Generally, the relation between the domain size D and the range size R0 and the effect of the relation on the image quality are as listed in Table 4 given below. The evaluation of the step edge part varies depending on whether or not edge enhancement processing and iterated processing are performed.

TABLE 4

|  | Step edge | Texture | Thinline | Smoothness |
|---|---|---|---|---|
| 2D < R0 | ○ | Δ | ○ | ○ |
| 2D = R0 | ○ | ○ | ○ | Δ |
| 2D > R0 | ○: Edge enhancement<br>Δ: No Edge enhancement | ○ | Δ | ○ |

In the third embodiment, the block size of 2D>R0 is used and thus problems of poor thin line concatenation and slightly noticeable jaggies occur.

Next, a fourth embodiment of image enlargement processing will be discussed. Here, an image enlargement processing section 55 comprises a first image enlargement processing section 560 as in the second embodiment.

FIG. 15 is a drawing to show examples of edge detection filters used in enlargement processing of the fourth embodiment. Separate filters are used for detecting horizontal and vertical edges.

The fourth embodiment is intended for solving the image quality problem of a thin line part in the third embodiment.

Thus, in the fourth embodiment, the edge detection filters shown in FIG. 15 are used to extract any desired specific part of a thin line part, etc., and when the desired specific part is extracted, domain block size D is switched to 3 and range block size R0 is switched to 7 and enlargement is executed with parameters as listed in Table 5 given below;

TABLE 5

|  | Domain block size | Range block size | α |
|---|---|---|---|
| 0th time<br>First time |  3 | 4 (original) | 0.0 |
| Edge | 3 | 7 (enlarged) | 0.4 |
| Other | 3 | 5 (enlarged) | 0.4 |
| Second time | 3 | 6 (enlarged) | 0.4 |
| Third time | 3 | 6 (enlarged) | 0.0 |

In the enlargement processing of the fourth embodiment, a 3×3 domain block is extracted at the first twice enlargement time. At this time, the edge detection filters shown in FIG. 15 are used to filter the 3×3 domain block. If the absolute values of values provided as a result of filtering are predetermined numbers or more in both vertical and horizontal directions, increase in edge strength and further the value of pixel standard deviation VDv provided in a similarity degree determination step is a predetermined number or more, the part is assumed to be a step edge part or a thin line part and the block sizes are switched to domain block size D=3 and range block size R0=7 for processing; otherwise, the domain block size D is set to 3 and the range block size R0 is, set to 5 for processing.

The edge detection filters enable reasonably strong edge parts to be reproduced more sharply according to domain block size D=3 and range block size R0=7. This means that the image can be enlarged with higher quality by changing the block sizes in edge parts for processing. Of course, the edge enhancement parameter α may be switched between an edge part and any other part.

More accurately a step edge part and a thin line part are extracted and the block sizes are switched to domain block size 3 and range block size 7 for enlargement, whereby a higher-quality enlarged image can be provided.

In the example, the processing parameters are changed in response to the extracted part only when the first twice enlargement is executed. However, a similar technique may also be applied at the second or later iterated processing. The detection filter specifications may be changed each time.

Next, a fifth embodiment of image enlargement processing will be discussed. Here, an image enlargement processing section 55 Comprises a first image enlargement processing section 560 as in the second embodiment. In the fifth embodiment, a four-time enlarged image rather than a twice enlarged image is prepared.

To prepare a four-time enlarged image, twice enlargement processing is performed twice according to the method of the third embodiment. This means that a twice enlarged image is again enlarged twice to provide a four-time enlarged image. The first twice enlargement and the second twice enlargement differ only in used pixel value conversion parameter bk as listed in Table 6 given below:

TABLE 6

| First time | Pixel value conversion parameter | Use of bk = dij − ak * rijk |
|---|---|---|
| Second time | Pixel value conversion parameter | Use of bk = Dv − ak * Rvk |

This effect is as follows: At the first time, the pixel value conversion parameter bk is adopted for each pixel, whereby a twice enlarged image faithful to the original image is provided. At the second twice enlargement, bk is adopted uniformly in the block, whereby the edges produced by the first enlargement are enlarged more smoothly at the second enlargement. The method of the fifth embodiment can be used to provide a four-time enlarged image of high quality.

To use bk=Dv−ak*Rvk, step edges can be enlarged sharply with less noise; in contrast, texture crush becomes remarkable particularly when the domain block size is large. This depends on the difference between linear approximation in batch and linear approximation while the shift amount is adjusted for each pixel when the pixel values in the domain block are approximated by the pixel values in the range block.

Thus, particularly in the first twice enlargement, it is better to use bk=bijk=dij−ak*rijk. At the stage at which the first enlargement processing terminates, texture parts are already enlarged and become step edge parts to soma extent and almost no texture parts exist. Thus, in the second enlargement, bk=Dv−ak*Rvk is used to enlarge the step edge parts more smoothly.

Thus, for example, to repeat twice enlarging an image n times to prepare a $2^n$ size image, it is advisable to adopt bk=bijk=dij−ak*rijk (expression (8)) for the first twice enlargement and bk=Dv−ak*Rvk (expression (6)) for the remaining twice enlargement.

In addition, for example, in the second twice enlargement, a simple average of the values or a weighted average method may be adopted. Accordingly, the image can be prevented from becoming picture-tinted, and natural image quality can be provided. The weighted average of the two may be used stepwise.

FIG. 16 lists the processing in the fifth embodiment with respect to general integer m-time enlargement and is a drawing to show examples of enlargement ratio combinations. In the examples shown in the figure, if the specified enlargement ratio can be represented by the product of two or more values (for example, the specified enlargement ratio is 6, 8, 9, etc.,), the enlargement ratio is divided for enlarging an image. The enlargement ratio that can be divided into two pieces is also divided into three or more pieces. Further, the enlargement processing can basically produce the highest effect when twice enlargement is executed. Therefore, in $2^n$-time enlargement (^ denotes exponentiation), processing of repeating twice enlargement n times is the best and thus if possible, such a combination is set.

If the user specifies a prime magnification of 5 times or 7 times, the value cannot furthermore be divided and thus processing of dividing the enlargement ratio for processing, thereby improving the image quality cannot be performed. In this case, a method of repeating twice enlargement for three times to enlarge the image eight times and then reducing the image to any desired size by projection reduction, is adopted as shown in a modification of image enlargement processing proposed in Japanese Patent Application No. 2001-341432 by the applicant of the invention.

Accordingly, the processing speed is sacrificed, but the method is greatly superior to the enlargement technique in the related art in image quality, and can provide a high-quality image. That is, when enlargement ratio K specified by the user is large, if the specified enlargement ratio K is divided into a combination of smaller enlargement ratios and enlargement repetition processing of applying the smaller enlargement ratios in order is performed, mosaic image quality degradation (like a block image) that can occur if the magnification is large can be decreased. This applies not only to prime magnifications, but also to magnifications other than $2^n$-times (for instance, six times). The way in which twice enlargement is repeated as much as possible and if the image becomes larger than any desired size, it is reduced to the desired size is the most desirable in point of the image quality.

That is, the enlargement ratio K specified by the user is first changed to nearest $2^n$ times (K≦$2^n$) and then twice enlargement is repeated n times and for K<$2^n$, reduction to K/$2^n$ is executed so that the enlargement ratio becomes the specified magnification K as indicated under "magnification combination to provide best image quality." Since such processing involves a trade-off between the processing time and the image quality, magnifications may be combined appropriately in response to the processing time or the image quality to which a higher priority is assigned. For example, for 9 to 15 times, four-time enlargement processing may be repeated twice to generate a 16-time enlarged image and then the image may be reduced to a predetermined size.

On the other hand, for example, if an image enlarged 2*2*2 times is reduced to ⅝ in five-time enlargement, memory is occupied more than necessary and the processing time is also taken. Therefore, as a well balanced combination of the processing time and the image quality, for example, as shown in the figure, an image enlarged 2*2 times is reduced to ⅝ and further the image is doubled, whereby the memory and the processing time can be used efficiently. In this case, some detail may be lost as compared with the method of 2*2*2−>⅝, but the basic image quality does not involve any problem. In general rational number q-time enlargement, for example, an integer n satisfying q<n is found and the image is enlarged n times and then is enlarged q/n times.

Next, a sixth embodiment of image enlargement processing will be discussed. The sixth embodiment provides a system fitted particularly for a color image. The first to fifth embodiments are examples of enlargement techniques concerning gray images. To apply the embodiments to color images, for example, for an RGB image, a technique of preparing separate 256-step gray images for R, G, and B and enlarging the images and then finally combining the images can be adopted. To use this method, however, KGB edge positions may minutely shift in an edge part and noise of R, G, or B or a mixed color thereof may occur.

This problem can be lessened by adopting a technique of determining the similarity degree on each of R, G, and B planes of a notable block, determining the range block search position based on the R, G, or B image having a higher similarity degree, and finding the pixel values of enlarged image based on the determined range block search position.

Thus, means is adopted for executing steps S120 to S200 (from domain block extraction to similarity degree determination) described above for the R, G, and B images and calculating the optimum range block position for each notable block and then calculating least square coefficients a and b between the notable block and the optimum range block in each of R, G, and B and performing optimization approximation of each color.

Alternatively, a technique of searching for the similarity degree as for the R, G, or B image with the maximum pixel standard deviation VDv and adopting the same position for the remaining two colors may be used. In this method, the pixel standard deviation VDv is already calculated at step S200 (see FIG. 9) and thus the actual search needs to be made only for the color of R, G, or B with the maximum pixel standard deviation VDv, so that the search processing time is reduced to a third.

To provide this control, when the input image is a color image, a control section 552 controls a domain block extraction section 662, a range block extraction section 664, a reduced range block preparation section 666, and a similarity degree determination section 668. This also applies to a first image enlargement processing section 560.

A pseudo gray image Y taking the sun of RGB signals (for instance, Y=R+G+B, 0.3R+0.6G+0.1B) may be found and may be used to perform processing to similarity degree determination. That is, only the range block positions are made the same in RGB and least square approximation of each RGB range block to RGB of notable block is conducted. If the means is used, the above-mentioned noise scarcely appears and although the reference block is made the same in RGB, pixel value conversion is executed with the optimum least square coefficients and thus the original image can be held faithful. To perform the processing, the memory capacity required for the processing and the time consumed for block search can be reduced to each a third, so that the memory efficiency can be enhanced and the processing can also be speeded up.

To generate a pseudo gray image, a configuration comprising a correspondence image generation section for providing a correspondence image corresponding to a color image based on color images corresponding to color components of the color image represented by a plurality of color components may be adopted, for example, as in modification of image enlargement processing proposed in Japanese Patent Application No. 2001-341432 by the applicant of the invention. Each of the enlarged image acquisition section 576 and the enlarged image acquisition section 676 may have a color enlarged image generation section 592 for combining images enlarged for colors into a color enlarged image.

The pseudo gray image Y provided by adding the color data representing color image at an adequate addition ratio has been used assuming that it can be considered that only the neighborhood extremely near to notable block image is adopted as a search range and large color change does not occur in the search range. If the search range is taken large, color change occurs and thus it is feared that a false signal may occur in the enlarged image. In this case, if the similarity degree is determined based on the distance on the color space and the pseudo gray image Y is corrected based on the determination result, the fear of occurrence of a false signal in the enlarged image is eliminated if the search range is taken large.

As described above, the enlargement processing methods of the embodiments use the concept of the fractal compression (enlargement) in the related arts in the portion of approximating a domain block by a range block of a larger size than the domain block (different in density if necessary). However, the enlargement processing methods of the embodiments are base on the assumption of image continuity that a range block similar to a notable block (domain block) exists in the same orientation (direction) to the neighborhood of the notable block (domain block), and differ in philosophy from the fractal compression techniques in the related art based on the standpoint that an image is globally self-similar. In addition, the enlargement processing methods of the embodiments also differ from the fractal compression techniques in the related arts in that in searching for a range block, a range block is selected from the neighborhood of the block corresponding to a domain block in the once enlarged image rather than the original image.

For enlargement based on the fractal compression techniques in the related arts, iterated projecting is performed based on the fixed-point theorem of contraction map for convergence. Thus, the pixel value conversion efficient a (corresponding to a contraction ratio) must basically be $-1<a<1$. In contrast, the enlargement processing methods of the embodiments do not use the iterated convergence processing in the sense of fractal. Thus, the condition $-1<a<1$ is not required and as described in the similarity degree determination section, the pixel value conversion parameters can be allowed under wider conditions, resulting in large improvement in the image quality.

The enlargement processing methods of the embodiments further differ from the fractal compression techniques in the related arts in that a once enlarged image is referenced and while a range block similar to the domain block is selected out of the enlarged image, re-enlargement processing is performed. As particularly preferred mode, the enlarged image thus generated is used and similar processing is iterated, so that the image quality improvement effect is built up and the effect of the iterated processing on the image quality improvement is extremely large. In addition, if edge enhancement processing is performed at an intermediate point of iteration, the edge strength at the enlargement time can also be controlled easily and effectively.

Therefore, the enlargement processing methods of the embodiments use the fractal technique in a part, but the provided enlarged image is not entered in the definition of attractor of fractal theory and therefore the enlargement differs in sense from the enlargement of a fractal compression image. Although the enlargement processing methods of the embodiments have different portions from the fractal concept in the related arts, the most useful concept of the fractal techniques (the concept of approximating a domain block by a range block larger than the domain block) forms an important element in the enlargement processing methods of the embodiments and largely contributes particularly to reproduction of sharpness of edges.

Figure 17:
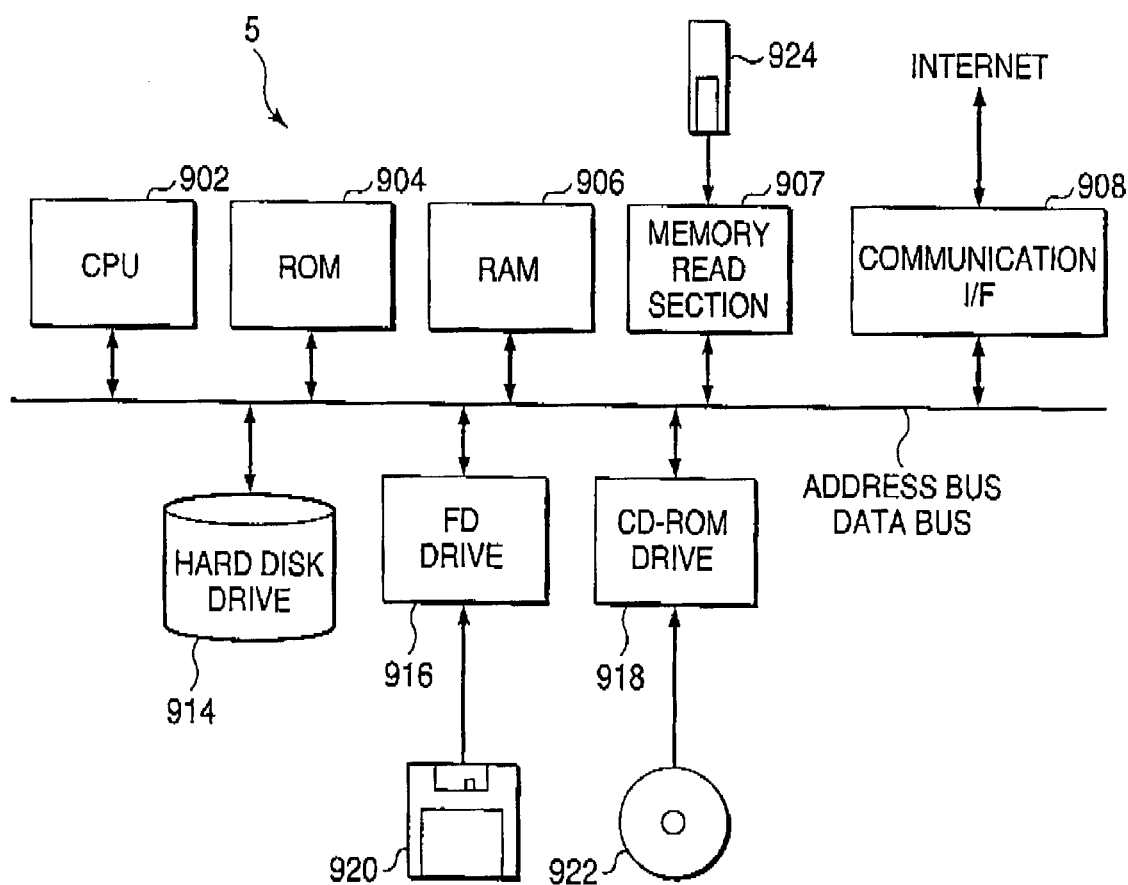
FIG. 17 is a drawing to show an example of the hardware configuration to form the image processing apparatus using an electronic computer.

FIG. 17 is a drawing to show an example of the hardware configuration to form an image processing apparatus 5 as software using a CPU and memory, namely, using an electronic computer.

The image processing apparatus 5 comprises a CPU 902, ROM (Read-Only Memory) 904, RAM (Random Access Memory) 906, and a communication I/F (interface) 908. It may also comprise a record and read unit for reading and recording data from a storage medium, such as a hard disk drive 914, a flexible disk (FD) drive 916, or a CD-ROM (Compact Disk ROM) drive 918. The hard disk drive 914, the FD drive 916, or the CD-ROM drive 918 is used to register program data to cause the CPU 902 to perform software processing. The communication I/F 908 serves as an interface for transferring communication data to and from a communication network such as the Internet.

The basic configuration and operation of the described image processing apparatus 5 can be made similar to those of the embodiments described above. A program for causing the computer to execute the above-described processing is distributed through a record medium such as CD-ROM 922, or may be stored on an FD 920 rather than the CD-ROM 922. An MO drive may be provided for storing the program on an MO disk or may be stored on any other storage medium such as flash memory, or more specifically, on a nonvolatile semiconductor memory card 924. Further, the program may be downloaded from another computer such as a server computer, via the communication network such as the Internet, so that the program is obtained or updated.

An optical record medium such as a DVD, a magnetic record medium such as MD, a magneto-optical record medium such as PD, a tape medium, and semiconductor memory such as an IC card or a miniature card, can be used as record media in addition to the FD 920 and the CD-ROM 922.

Some or all functions of the processing in the image processing apparatus 5 described as the embodiments can be stored on the FD 920 or on the CD-ROM 922, as a record medium example. Therefore, the following program and the storage medium storing the program can be provided.

For example, the program for the image processing apparatus 5, namely, software installed in the RAM 906, comprises the functional parts of domain block extraction section 562, 662, range block extraction section 564, 664, reduced range block preparation section 566, 666, similarity degree determination section 568, 668, enlarged range block preparation section 570, enlarged pseudo domain block preparation section 670, enlarged image acquisition section 576, 676, block image combining unit 578, 678, and overlap processing unit 586, 686, like the image enlargement processing section 55 described above.

The software is stored on a portable storage medium such as CD-ROM or FD, for example, as a printer driver or a device driver, or may be distributed via a computer network.

For example, to implement the image processing apparatus 5 as a computer, the CD-ROM drive 918 reads the data or the program from the CD-ROM 922 and passes the data or the program to the CPU 902. The software is installed in the hard disk drive 914 from the CD-ROM 922. The hard disk drive 914 stores the data or the program read by the FD drive 916 or the CD-ROM drive 918 and the data prepared as the CPU 902 executes the program, and reads the stored data or program and passes the data or program to the CPU 902.

The software stored in the hard disk drive 914 is read into the RAM 906 and then is executed by the CPU 902. For example, the CPU 902 executes the above-described processing based on the programs stored in the ROM 904 and the RAM 906 as storage medium examples, whereby the functions for the image enlargement processing described above can be provided as software.

Although the invention has been described with the embodiments, it is understood that the technical scope of the invention is not limited to the embodiments. Various changes or improvements can be added to the embodiments and forms to which such changes or improvements are added are also included in the technical scope of the invention. The embodiments do not limit the invention defined by the claims and all combinations of features described in the embodiments are not necessarily indispensable for the solution means of the invention.

For example, the similarity degree determination section 568 makes a comparison between a reduced range block image and a domain block image, thereby determining the degree of similarity therebetween, but a domain block may be enlarged to the same size as a range block and a comparison may be made between the enlarged domain block and the range block image, thereby determining the degree of similarity therebetween.

To set a range block to the neighborhood of a domain block, a plurality of range blocks are previously extracted to the neighborhood of the domain block and a range block having a high degree of similarity with the domain block is selected from among the range blocks, but any other technique may be used to set a range block to the neighborhood of a domain block. For example, image features are previously analyzed and from the image characteristic, the direction of the range block to be set may be found for each domain block.

In the fourth embodiment, considering only the edge characteristic of the domain block image features, parts are separated and enlargement processing is performed with the parameters fitted for the extracted parts, but the invention is not limited to it. For example, considering also the busy characteristic and the flat characteristic, parts maybe separated and enlargement processing may be performed with the parameters responsive to each characteristic.

In the embodiments, the second image enlargement processing section 660 repeats the local collage processing more than once, but may perform the processing only once.

In each of the embodiments, the configuration of using enlarged image data to perform print processing and display has been described, but the invention is not limited to it. For example, the invention can also be applied to various machines and systems for handling images, such as a copier comprising the color scanner 32, the image processing apparatus 5, and the print engine 70 in one piece.

As described above, according to the image processing apparatus of the invention, while the concept of the fractal enlargement technique is used, a range block is selected from the neighborhood of the block corresponding to the domain block in the once enlarged image rather than the original image and when the final enlarged image of the original image is generated, equal-magnification or reductive projection processing is performed.

Thus, the concept of fractal can be used to prevent occurrence of image quality degradation such as blurring, jaggies, and block distortion, the elements of image quality improvement such as sharp edge reproduction, more accurate reproduction of a texture part, restoration of thin lines, and noise removal can be executed at the same time with high quality, and an enlarged image of very high quality can be generated. The advantage is still more enhanced as edge enhancement processing and iterated convergence processing are performed in combination.

To use several-time iterated processing, the processing time is increased, but it is made possible to make range block search in each enlargement in a very narrow range, so that the processing can be more speeded up in the portion and consequently high-speed processing can be accomplished.

What is claimed is:

1. An image processing apparatus for performing enlargement processing of an original image represented by a large number of pixels to provide an enlarged image, said image processing apparatus comprising:
    a first image enlargement processing section for enlarging the original image at a preset enlargement ratio;
    a domain block extraction section for dividing the original image in first block units, thereby extracting a plurality of domain block images;
    a range block extraction section for extracting a range block image in a second block unit larger than the first block unit from an initial enlarged image provided by said first image enlargement processing section;
    an enlarged pseudo domain block preparation section for projecting the range block image extracted by said range block extraction section to an enlarged block unit provided by enlarging the first block unit at a preset enlargement ratio, and converting each of pixel values of the image placed in the enlarged block unit based on the relationship between the domain block image and the range block image, thereby preparing an enlarged pseudo domain block image; and an enlarged image acquisition section for acquiring an enlarged image provided by enlarging the original image at the preset enlargement ratio using each enlarged pseudo domain block image prepared by said enlarged pseudo domain block preparation section.

2. The image processing apparatus as claimed in claim 1, wherein
said range block extraction section extracts the range block image from a neighborhood of a position in the initial enlarged image, the position where the enlarged pseudo domain block is to be placed corresponding to a position of the domain block.

3. The image processing apparatus as claimed in claim 2, wherein
said range block extraction section extracts the range block image from the initial enlarged image so that the range block includes a part in common with the enlarged pseudo domain block when the enlarged pseudo domain block is placed in the initial enlarged image corresponding to a position of the domain block.

4. The image processing apparatus as claimed in claim 1, wherein
said range block extraction section divides a neighborhood of a position in the initial enlarged image, the position where the enlarged pseudo domain block is to be placed corresponding to a position of the domain block, thereby extracting a plurality of the range block images, said image processing apparatus further comprising:
a similarity degree determination section for determining the degree of similarity between each of the range block images extracted by said range block extraction section and the domain block image extracted by said domain block extraction section, wherein
said enlarged pseudo domain block preparation section enlarges the range block image determined to have a higher degree of similarity with the domain block image by the similarity degree determination section among the plurality of range block images to the enlarged block unit to prepare the enlarged range block image.

5. The image processing apparatus as claimed in claim 4, further comprising:
a reduced range block preparation section for reducing the range block images extracted by said range block extraction section to the first block unit to prepare a plurality of reduced range block images, wherein
said similarity degree determination section determines the degree of similarity using the domain block image and the plurality of reduced range block images prepared by the reduced range block preparation section.

6. The image processing apparatus as claimed in claim 5, wherein
said similarity degree determination section executes pixel value conversion of each pixel value z of the plurality of reduced range block images prepared by said reduced range block preparation section based on a linear transformation expression az+b where a and b are coefficients, and selects the reduced range block image most similar to the domain block image from among the plurality of reduced range block images subjected to the pixel value conversion, and wherein
said enlarged pseudo domain block preparation section projects the range block image on which the reduced range block image selected by said similarity degree determination section is based to the enlarged block unit and executes pixel value conversion of each pixel value of the image based on the linear transformation expression az+b to prepare the enlarged pseudo domain block image.

7. The image processing apparatus as claimed in claim 6, wherein
said enlarged pseudo domain block preparation section uses bp=dp−a*rp where dp is the pixel value of the correspondence pixel of the domain block image and rp is the pixel value of the correspondence pixel of the reduced range block image as the value of coefficient bp in the linear transformation expression for the each pixel having a position p.

8. The image processing apparatus as claimed in claim 4, further comprising:
a complexity degree determination section for determining the degree of complexity of the range block image, wherein
said similarity degree determination section refers to the degree of complexity of the range block image determined by said complexity degree determination section and determines the degree of similarity.

9. The image processing apparatus as claimed in claim 1, wherein,
said domain block extraction section switches an image read start position in order and divides the original image in the first block units, thereby extracting the domain block image, and wherein
said enlarged image acquisition section has an overlap processing unit for finding pixel values of an overlap part that occur in processing with the image read start position switched in order in each enlarged image corresponding to the original image, found in processing with the image read start position switched in order based on pixel values of pixels of the overlap part.

10. The image processing apparatus as claimed in claim 1, wherein
said enlarged image acquisition section divides a previously specified enlargement ratio into a combination of smaller enlargement ratios, adopts each smaller enlargement ratio as the setup enlargement ratio, and performs enlargement repetition processing of applying the smaller enlargement ratios in order.

11. The image processing apparatus as claimed in claim 10, wherein
at least either of said domain block extraction section and said range block extraction section changes the size of the first block unit each time the smaller enlargement ratio is applied in order.

12. The image processing apparatus as claimed in claim 1, further comprising:
an edge enhancement processing section for performing edge enhancement processing for the enlarged pseudo domain block image generated by said enlarged pseudo domain block preparation section.

13. The image processing apparatus as claimed in claim 12, wherein
said edge enhancement processing section performs the edge enhancement processing based on the relationship between a maximum value and a minimum value of the pixels in the enlarged pseudo domain block.

14. The image processing apparatus as claimed in claim 12, wherein
said edge enhancement processing section calculates an average value of a maximum pixel value and a minimum pixel value in the enlarged pseudo domain block and converts the pixel value larger than the average value into a larger value in response to the distance from the average value and the pixel value smaller than the average value into a smaller value in response to the distance from the average value, in response to the strength of the edge enhancement.

15. The image processing apparatus as claimed in claim 12, wherein
said range block extraction section switches the size of the second block unit in response to a strength degree of the edge enhancement set by said edge enhancement processing section.

16. The image processing apparatus as claimed in claim 1, further comprising:
an iterated processing control section for iterating enlargement processing a predetermined number of times by controlling said range block extraction section so as to re-extract the range block image using the enlarged image acquired by said enlarged image acquisition section in place of the initial enlarged image after said enlarged image acquisition section acquires the enlarged image provided by enlarging the original image at the preset enlargement ratio.

17. The image processing apparatus as claimed in claim 12, further comprising:
an iterated processing control section for iterating enlargement processing a predetermined number of times by controlling said range block extraction section so as to re-extract the range block image from the enlarged image acquired by said enlarged image acquisition section in place of the initial enlarged image after said enlarged image acquisition section acquires the enlarged image provided by enlarging the original image at the preset enlargement ratio.

18. The image processing apparatus as claimed in claim 17, wherein
said iterated processing control section switches at least one of the domain block size, the range block size, and the strength of the edge enhancement in iterating the enlargement processing the predetermined number of times.

19. The image processing apparatus as claimed in claim 1, wherein
said first image enlargement processing section comprises:
a second domain block extraction section for dividing the original image in the first block units, thereby extracting a plurality of domain block images;
a second range block extraction section for extracting a range block image in a second block unit larger than the first block unit and smaller than the enlarged block unit from the original image provided by enlarging the first block unit at the preset enlargement ratio;
an enlarged range block preparation section for enlarging the range block image extracted by said second range block extraction section to the enlarged block unit and converting pixel values of the image enlarged to the enlarged block unit based on the relationship between the domain block image and the range block image, thereby preparing an enlarged range block image; and
a second enlarged image acquisition section for acquiring an enlarged image provided by enlarging the original image at the preset enlargement ratio using each enlarged range block image prepared by said enlarged range block preparation section.

20. The image processing apparatus as claimed in claim 1, wherein
said first image enlargement processing section uses nearest neighbor method to prepare the initial enlarged image.

21. The image processing apparatus as claimed in claim 19, wherein
said second range block extraction section extracts the range block image from the original image so that the range block includes a part in common with the domain block.

22. The image processing apparatus as claimed in claim 1, further comprising:
a control section for controlling so as to select the same range block position for each color components and perform enlargement processing when enlargement processing is performed for a color image.

23. An image processing method for performing image enlargement processing, said image processing method comprising the steps of:
enlarging the original image at a preset enlargement ratio;
dividing the original image in first block units, thereby extracting a plurality of domain block images;
extracting a range block image in a second block unit larger than the first block unit from an initial enlarged image provided by said enlarging step;
placing the range block image in an enlarged block unit provided by enlarging the first block unit at a preset enlargement ratio, and converting each of pixel values of the image placed in the enlarged block unit based on the relationship between the domain block image and the range block image, thereby preparing an enlarged pseudo domain block image; and
acquiring an enlarged image provided by enlarging the original image at the preset enlargement ratio using each enlarged pseudo domain block image.

24. A computer medium or a computer readable medium comprising image enlargement processing of an original image represented by a large number of pixels to provide an enlarged image, said image enlargement processing comprising the steps of:
enlarging the original image at a preset enlargement ratio;
dividing the original image in first block units, thereby extracting a plurality of domain block images;
extracting a range block image in a second block unit larger than the first block unit from an initial enlarged image provided by said enlarging step;
placing the range block image in an enlarged block unit provided by enlarging the first block unit at a preset enlargement ratio, and converting each of pixel values of the image placed in the enlarged block unit based on the relationship between the domain block image and the range block image, thereby preparing an enlarged pseudo domain block image; and
acquiring an enlarged image provided by enlarging the original image at the preset enlargement ratio using each enlarged pseudo domain block image.

* * * * *